United States Patent
Aberg

(10) Patent No.: US 9,565,067 B1
(45) Date of Patent: Feb. 7, 2017

(54) HETEROGENEOUS UNITS MANAGEMENT SYSTEM WITH DIMENSIONLESS, AMBIGUOUS, AND PARTIAL UNITS

(71) Applicant: The MathWorks, Inc., Natick, MA (US)

(72) Inventor: Robert O. Aberg, South Grafton, MA (US)

(73) Assignee: The MathWorks, Inc., Natick, MA (US)

( * ) Notice: Subject to any disclaimer, the term of this patent is extended or adjusted under 35 U.S.C. 154(b) by 303 days.

(21) Appl. No.: 14/185,520

(22) Filed: Feb. 20, 2014

(51) Int. Cl.
*G06F 15/173* (2006.01)
*H04L 12/24* (2006.01)

(52) U.S. Cl.
CPC .................................. *H04L 41/145* (2013.01)

(58) Field of Classification Search
CPC ........................................................ G06F 19/12
USPC ......................................................... 709/223
See application file for complete search history.

(56) References Cited

U.S. PATENT DOCUMENTS

| | | | |
|---|---|---|---|
| 7,624,000 B2 | 11/2009 | Kierzenka et al. | |
| 8,015,544 B1* | 9/2011 | Englehart | G06F 8/35 715/762 |
| 2005/0283297 A1* | 12/2005 | Surianarayanan | F16D 48/066 701/51 |
| 2009/0006301 A1* | 1/2009 | Goetsch | G06F 17/30507 706/47 |
| 2011/0219940 A1* | 9/2011 | Jiang | G10H 1/0025 84/622 |
| 2015/0227589 A1* | 8/2015 | Chakrabarti | G06F 17/30507 707/748 |

OTHER PUBLICATIONS

U.S. NPL by Mathworks, "Simulink—Dynamic System Simulation for Matlab: Using Simulink Version 3" 1999, pp. 1-605.*
U.S. NPL by JMAAB "Plant Modeling Guidelines using Matlab and Simulink Version 2.1" Dec. 2, 2008, pp. 1-57.*
Mattsson et al., "Unit Checking and Quantity Conservation", The Modelica Association, Modelica 2008, Mar. 3-4, 2008, 8 pages.
Wikipedia, "Units conversion by factor-label", http://en.wikipedia.org/wiki/Units_conversion_by_factor-label, Sep. 17, 2013, 4 pages.

(Continued)

*Primary Examiner* — Phuoc Nguyen
(74) *Attorney, Agent, or Firm* — Harrity & Harrity, LLP

(57) ABSTRACT

A device may receive information identifying a model that, when executed, may cause an operation to be performed. The device may identify a unit associated with the operation. The device may determine that the unit is at least one of: an abstract unit, a unit associated with a dimensionless quantity, a sub-unit, a partial unit, a dynamic unit, or an enumerated unit. The device may determine information that identifies a unit property associated with the unit. The unit property may identify an attribute that is to be used to determine a unit rule associated with the unit. The device may determine a unit rule based on the unit property and information associated with the operation. The unit rule may indicate a manner in which the device is to determine a result associated with the operation. The device may provide the result, associated with the operation, based on the unit rule.

20 Claims, 16 Drawing Sheets

(56) References Cited

OTHER PUBLICATIONS

Wikipedia, "Dimensional analysis", http://en.wikipedia.org/wiki/Dimensional_analysis Sep. 3, 2013, 20 pages.
NIST, "B.9 Factors for units listed by kind of quantity or field of science", NIST Guide to SI Units—Appendix B9. Conversion Factors, http://physics.nist.gov/Pubs/SP811/appenB9.html, Feb. 1, 2001, 23 pages.
Wikipedia, "ISO/IEC 80000", http://en.wikipedia.org/wiki/ISO/IEC_80000, Nov. 2, 2013, 3 pages.
Wikipedia, "Conversion of units", http://en.wikipedia.org/wiki/Conversion_of_units, Sep. 30, 2013, 35 pages.
Wikipedia, "ISO 31", http://en.wikipedia.org/wiki/ISO_31, Jun. 10, 2013, 3 pages.
Taylor et al., "The International System of Units (SI)", NIST Special Publication 330, 2008 Edition, U.S. Department of Commerce, Mar. 2008, 97 pages.
NIST, "Bibliography: links, citations, and online publications" http://physics.nist.gov/cuu/Units/bibliography.html, Apr. 2004, 4 pages.
NIST, "Relationships of the SI derived units with special names and symbols and the SI base units", http://physics.nist.gov/cuu/Units/SIdiagram.html, Feb. 1, 2001, 1 page.
NIST, "Prefixes for binary multiples", http://physics.nist.gov/cuu/Units/binary.html, Feb. 1, 2001, 3 pages.
Thompson et al., "Guide for the Use of the International System of Units (SI)" NIST Special Publication 811, 2008 Edition, U.S. Department of Commerce, Mar. 2008, 90 pages.
The International Bureau of Weights and Measures, "The International System of Units (SI)", The BIPM and the Metre Convention, $8^{th}$ Edition, 2006, 88 pages.
Novak, "Conversion of Units of Measurement", IEEE Transactions on Software Engineering, vol. 21, No. 8, Aug. 1, 1997, 26 pages.

\* cited by examiner

| Abstract Unit Name 540 | Definition 545 | Specific Unit 550 |
|---|---|---|
| Length | - | meter, foot, mile... |
| Time | - | second, hour... |
| Mass | - | Kilogram... |
| Temperature | - | Celsius, Kelvin, Farenheit... |
| Force | $\underline{\frac{Mass \times Length}{Time^2}}$ | Newton... |
| Area | $Length^2$ | $meter^2$, $foot^2$... |
| Pressure | Force/Area | Pascal, inHg, atm... |
| Work | Force×Length | Joule, foot-pound... |
| Power | Work/Time | Watt, horsepower... |
| Permeability | $Length^2$ | $meter^2$, Darcy... |
| Ratio | Unit/Unit | Re, Pr... |

FIG. 5B

HETEROGENEOUS UNITS MANAGEMENT SYSTEM WITH DIMENSIONLESS, AMBIGUOUS, AND PARTIAL UNITS

BRIEF DESCRIPTION OF THE DRAWINGS

FIGS. 5A and 5B are diagrams of example data structures that store unit property information;

DETAILED DESCRIPTION

A client device may be capable of managing units associated with an element (e.g., an input, an output, a block, a signal, etc.) included in a model (e.g., a graphical model) of a system (e.g., a dynamic system, a static system, etc.). For example, the client device may be capable of converting a first unit, associated with a value, to a second unit, based on information stored by the client device. However, numerous issues may occur in the area of unit management in a graphical model. For example, a common problem is the inability of the client device to properly handle a value that is dimensionless (e.g., a value that has no unit) that needs to be used in conjunction with another value that is associated with a unit (e.g., a unit of mass, a unit of length, a unit of time, etc.). In many cases, the client device may not detect, prevent, and/or warn a user, associated with the client device, regarding issues that may result from managing one or more units associated with a model. This may result in an inaccurate, incorrect, or otherwise undesirable result being generated by the model.

Implementations described herein may allow a client device to manage a unit, included in a model, and may also allow the client device to warn against, prevent, and/or detect one or more issues associated with managing the unit. In this way, the unit may be effectively managed by the client device, and the user may be apprised of unit related issues (e.g., the user may ensure that execution of the model is not affected by the unit related issue).

Figure 1:
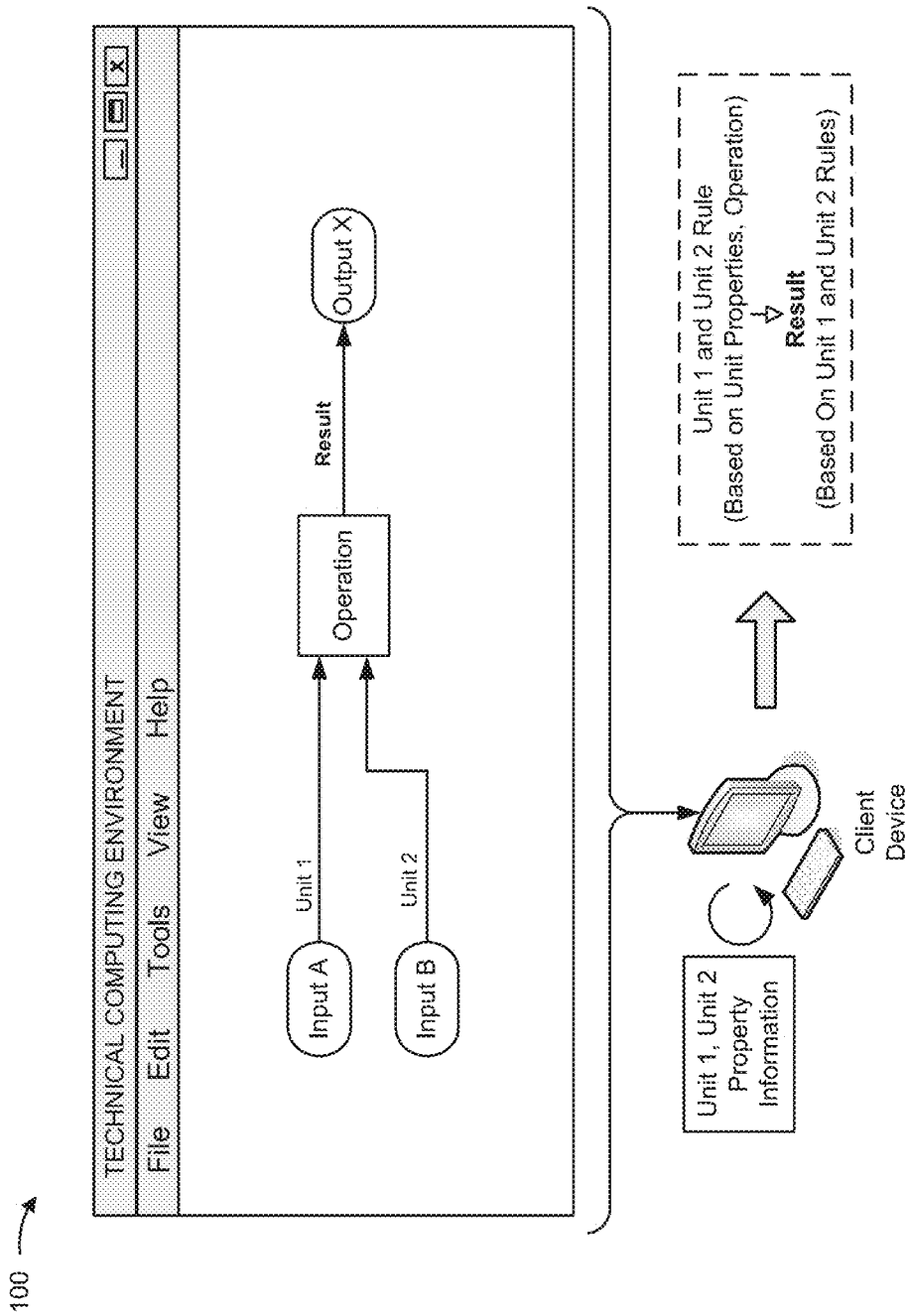
FIG. 1 is a diagram of an overview of an example implementation described herein.

FIG. 1 is a diagram of an overview of an example implementation 100 described herein. For the purposes of FIG. 1, assume that a user has generated (e.g., via a technical computing environment included in a client device) a graphical model of a system. Further, assume that the model includes two inputs (e.g., input A, input B), and that each of the inputs is associated with a unit (e.g., unit 1, unit 2). Finally, assume that that the client device stores information, associated with unit 1 and unit 2, that identifies unit properties associated with unit 1 and unit 2.

As shown in FIG. 1, the client device may receive the graphical model, and may determine that unit 1 and unit 2 (e.g., associated with Input A and Input B, respectively) are to be manipulated, based on an operation included in the model, to produce a result to an output block, output X. As further shown, the client device may determine (e.g., based on information stored by the client device) information that identifies a first set of unit properties, associated with unit 1, and may determine information that identifies a second set of unit properties, associated with unit 2.

As further shown in FIG. 1, the client device may determine a unit rule, associated with unit 1 and unit 2, based on the unit 1 properties, the unit 2 properties, and the operation included in the model. As shown, the client device may provide a result (e.g., a unit conversion, a result of the operation, a warning, an error, etc.), associated with the operation, based on the unit rule. In this way, the client device may manage one or more units included in a model, and/or may prevent, detect, and/or warn against one or more issues associated with the one or more units.

Figure 2:
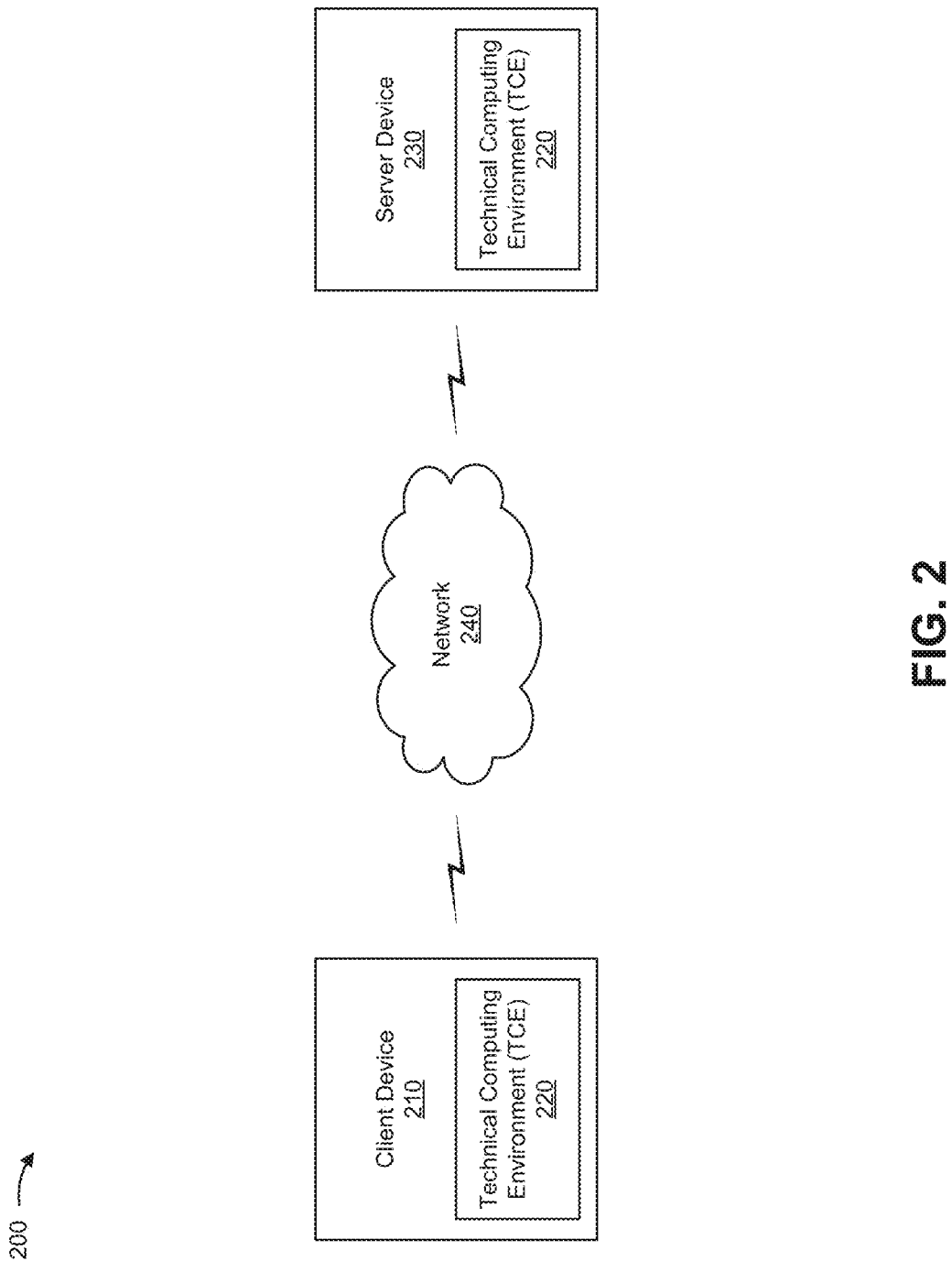
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include a device capable of receiving, generating, processing, executing, and/or providing information associated with managing one or more units included in a model. For example, client device 210 may include a computing device, such as a desktop computer, a laptop computer, a tablet computer, a handheld computer, a server, a mobile phone (e.g., a smart phone, a radiotelephone, etc.), or a similar device. In some implementations, client device 210 may receive information from and/or transmit information (e.g., information associated with managing the one or more units) to server device 230.

Client device 210 may host TCE 220. TCE 220 may include any hardware-based logic or a combination of hardware and software-based logic that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; StateWORKS Studio by StateWORKS, etc.), or another type of environment, such as a hybrid environment that may include, for example, a text-based environment and a graphically-based environment.

TCE 220 may include a modeling system that may be used in the creation of a functional model and that may enable generation of executable code based on the model. For example, TCE 220 may include a graphical modeling application that provides a user interface for a computing environment. Additionally, or alternatively, TCE 220 may include a graphical modeling application that provides a user interface for modeling and/or simulating (e.g., by executing a model) a dynamic system (e.g., based on differential equations, difference equations, algebraic equations, discrete events, discrete states, stochastic relations, etc.). A dynamic system (either natural or man-made) may include a system, where a response of the system at any given time may be a function of input stimuli associated with the system, a current state associated with the system, and/or a current time.

The system represented by a model may have various execution semantics that may be represented in the model as a collection of modeling entities, often referred to as blocks. A block may generally refer to a portion of functionality that may be used in the model. The block may be represented graphically, textually, and/or stored in some form of internal representation. Also, a particular visual depiction used to represent the block, for example in a graphical block diagram, may be a design choice. A block may be hierarchical in that the block itself may comprise one or more blocks that collectively make up the block.

A graphical model (e.g., a functional model) may include entities with relationships between the entities, and the relationships and/or the entities may have attributes associated with them. The entities may include model elements, such as blocks and/or ports. The relationships may include model elements, such as lines (e.g., connector lines) and references. The attributes may include model elements, such as value information and meta information for the model element associated with the attributes. A graphical model may be associated with configuration information. The configuration information may include information for the graphical model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics and/or may be executable. An executable graphical model may be a time based block diagram. A time based block diagram may consist, for example, of blocks connected by lines (e.g., connector lines) that can represent signal values. The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks. A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks may be causal and/or non-causal. For example, a model (e.g., a functional model) may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

Server device 230 may include one or more devices capable of receiving, generating, storing, processing, and/or providing information associated with managing one or more units included in a model. For example, server device 230 may include a computing device, such as a server, a desktop computer, a laptop computer, a tablet computer, a handheld computer, or a similar device. In some implementations, server device 230 may host TCE 220.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
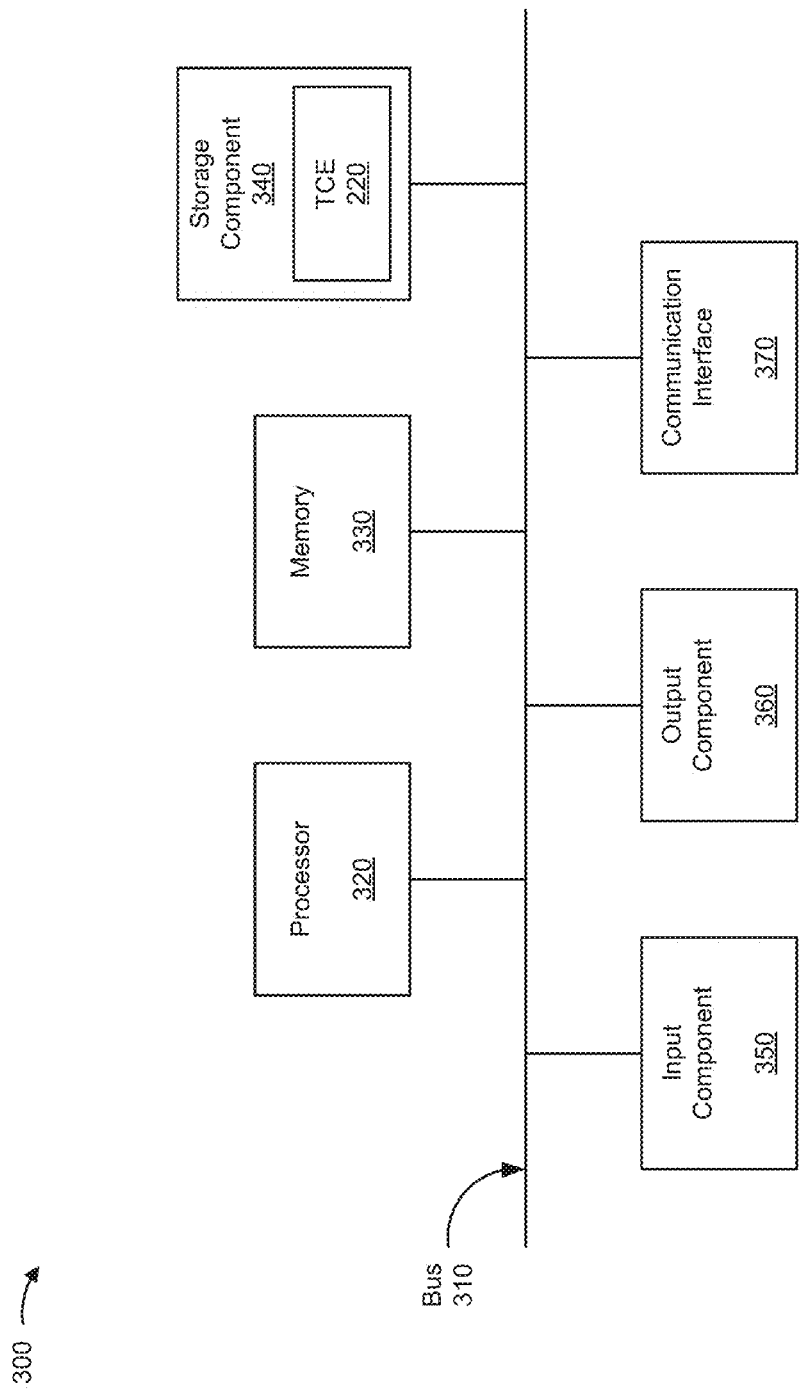
FIG. 3 is a diagram of example components of one or more devices of FIG. 2.

FIG. 3 is a diagram of example components of a device 300, which may correspond to client device 210 and/or server device 230. In some implementations, each of client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing logic (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, or the like.

Device 300 may perform various operations described herein. Device 300 may perform these operations in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
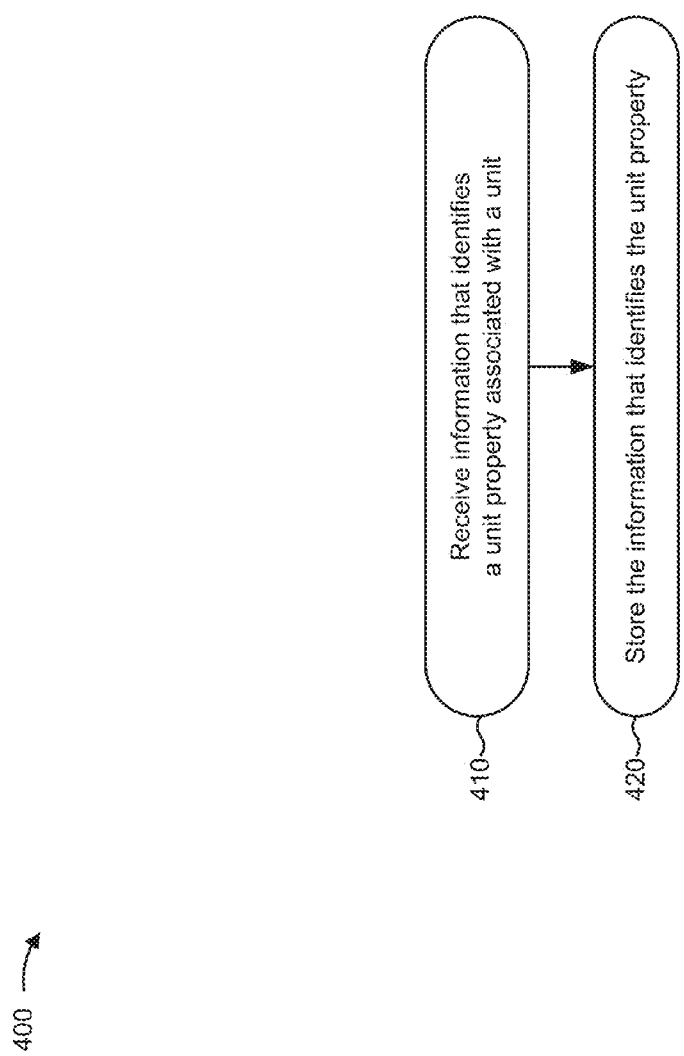
FIG. 4 is a flow chart of an example process for receiving and storing information identifying a unit property.

FIG. 4 is a flow chart of an example process 400 for receiving and storing information identifying a unit property. In some implementations, the process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include receiving information that identifies a unit property associated with a unit (block 410). For example, client device 210 may receive information that identifies a unit property, associated with a unit. In some implementations, client device 210 may receive the information from another device, such as server device 230 (e.g., when server device 230 stores the information associated with the unit property). Additionally, or alternatively, client device 210 (e.g., TCE 220) may provide a user interface, to a user, that allows the user to input the information that identifies the unit property. In some implementations, the user interface may be provided as a separate window, such as a popup window. In some implementations, the user may provide, to the user interface, the information that identifies the unit property. The user may provide the information that identifies the unit property in other ways, including ways that do not include a user interface.

In some implementations, the unit property may be associated with a specific unit (e.g., a meter, a foot, a kilogram, a second, etc.). Additionally, or alternatively, the unit property may be associated with an abstract unit. An abstract unit may include a unit that is a taxonometric parent of a specific unit. For example, length may be an abstract unit of specific unit meter, specific unit foot, and so on. As another example, pressure may be an abstract unit of specific unit Pascal ("Pa"), inch of Mercury ("inHg"), and so on.

A unit property may include information, associated with a unit (e.g., a specific unit, an abstract unit, etc.) included in a model, that identifies an attribute that may be used to determine a unit rule associated with managing the unit. For example, a first unit property, (e.g., associated with a first unit) may be used in conjunction with a second unit property (e.g., associated with a second unit or the first unit) to determine a unit rule associated with managing the first unit when executing the model (e.g., when performing an operation associated with the first unit). In some implementations, the unit property may be a default unit property (e.g., a unit property stored by client device 210 and/or server device 230, etc.). Additionally, or alternatively, the user may create and/or modify the unit property (e.g., via client device 210) associated with the unit (e.g., the user may define the unit, the user may change an existing unit property, etc.).

In some implementations, the unit property may include information identifying the unit (e.g., a unit name, a unit symbol, etc.), information associated with a unit conversion associated with the unit (e.g., a preferred conversions unit, a conversion factor, a dependency associated with converting the unit, etc.), information that identifies a unit type associated with the unit (e.g., a sub-unit, a partial unit, an approximate unit, a dynamic unit, an enumerated unit, etc.), information identifying a user preference associated with the unit (e.g., a preferred specific unit associated with an abstract unit, a preferred prefix, a preferred display convention, etc.), information identifying an origin associated with the unit (e.g., whether the unit is user defined, whether the unit can be traced to provenance associated with the unit, whether the user has altered a unit property associated with the unit, etc.), unit scope information that may be used to determine a unit rule associated with managing the unit (e.g., information identifying the unit as a dimensionless unit, information associated with an operation that may (or may not) be performed on a value associated with the unit, information associated with a warning that is to be provided when managing the unit, etc.), information associated with an abstract unit property (e.g., a definition of an abstract unit in terms of two or more other abstract units, an abstract unit type, etc.), information associated with identifying the unit as an active unit (e.g., information indicating that a unit is to be taken into account when performing an operation, etc.), information associated with identifying the unit as an inactive unit (e.g., information indicating that a unit is to be ignored when performing an operation, etc.) or the like.

As further shown in FIG. 4, process 400 may include storing the information that identifies the unit property (block 420). For example, client device 210 may store the information that identifies the unit property in a data structure. In some implementations, client device 210 may store the information that identifies the unit property in a memory location (e.g., a RAM, a hard disk, etc.) of client device 210. Additionally, or alternatively, client device 210 may transmit the information that identifies the unit property to another device (e.g., storage device 230, etc.) for storage.

Although FIG. 4 shows example blocks of process 400, in some implementations, process 400 may include additional blocks, different blocks, fewer blocks, or differently arranged blocks than those depicted in FIG. 4. Additionally, or alternatively, two or more of the blocks of process 400 may be performed in parallel.

Figure 5A:

FIGS. 5A and 5B are diagrams of example data structures 500 and 535 that store unit property information. Data structure 500 and/or data structure 535 may be stored in a memory device (e.g., a RAM, a hard disk, etc.) associated with one or more devices and/or components of FIG. 2 and/or FIG. 3. For example, data structure 500 and/or data structure 535 may be stored by client device 210 and/or server device 230.

As shown in FIG. 5A, data structure 500 may include a collection of fields associated with a specific unit, such as a unit name field 505, a symbol field 510, a conversion field 515, an abstract unit type field 520, a preferred prefix field 525, and a scope field 530.

Unit name field 505 may store information that identifies a unit name associated with a unit property received by client device 210. For example, unit name field 505 may store a string of characters that identifies the unit name, associated with the unit property, received by client device 210.

Symbol field 510 may store information that identifies the unit identified in unit name field 505. In some implementations, the information may include an abbreviation and/or a symbol. For example, symbol field 510 may store a character (e.g., "m"), a string of characters (e.g., "hp-mech"), a non-ASCII symbol (e.g., "ϵ"), or other information that may be used to identify the unit included in unit name field 505.

Conversion field 515 may store information that identifies a unit property associated with a conversion that may be performed on the unit identified in unit name field 505. For example, conversion field 515 may store information that identifies a numerator and a denominator associated with a conversion factor and a unit of conversion associated with the conversion factor (e.g., "0.0254 m/in"). In some implementations, information stored in conversion field 515 may include information associated with an exact conversion (e.g., when the conversion factor is not-rounded, when the conversion factor is legally defined, etc.), information associated with an approximate conversion (e.g., when the conversion factor is rounded, when the conversion factor is approximate, etc.), information associated with a dynamic conversion (e.g., when the conversion factor is dynamic), and/or information associated with a user defined conversion (e.g., when the user determines and provides the conversion factor). In some implementations, conversion field 515 may store information that identifies multiple conversions (e.g., 0.0254 m/in, 1 foot/12 in, etc.). For example, data structure 500 may include information that identifies the multiple conversions in a single conversion field 515. Alternatively, data structure 500 may include multiple conversion fields 515, and each conversion field 515 may store information associated with a single conversion.

Abstract unit type field 520 may store information that identifies a unit property associated with an abstract unit type of the unit identified in unit name field 505. For example, abstract unit type field 520 may include a string of characters (e.g., "Length") that identifies an abstract unit type of a specific unit identified in unit name field 505 (e.g. "meter"). In some implementations, abstract unit type field 520 may be used to identify a unit property included in data structure 535. For example, client device 210 may determine that a meter is associated with an abstract unit of length (e.g., based on information stored in abstract unit type field 520), and client device 210 may determine another unit property (e.g., associated with an abstract unit of length) based on information stored in one or more fields of data structure 535.

Preferred prefix field 525 may store information that identifies a unit property associated with a preferred prefix of the unit identified in unit name field 505. For example, preferred prefix field 525 may include a string of characters (e.g., kilojoules ("kJ")) that identifies a preferred prefix associated with the unit identified in unit name field 505 (e.g., joules). In some implementations, preferred prefix field 525 may include information that identifies a default preferred prefix (e.g., when no preferred prefix has been specified by the user, etc.). Additionally, or alternatively, preferred prefix field 525 may include information based on a user selected prefix (e.g., when the user specifies a preferred prefix, when the user specifies and/or selects a set of preferred prefixes, etc.).

Scope field 530 may store information that identifies a unit property that may be used to determine a unit rule associated with the unit identified in unit name field 505 (e.g., a unit property associated with identifying a unit as a default unit, a constraint associated with a unit, a handling rule associated with a unit, a unit propagation rule, etc.). For example, scope field 530 may include information associated with the origin of the unit (e.g., whether the unit is user defined, whether the unit can be traced to provenance, etc.), information identifying the unit as a sub-unit of another unit, information identifying the unit as dimensionless, information indicating a dependency associated with the unit, information associated with an operation that may (or may not) be performed upon a value associated with the unit, and/or other information that may be used to determine the unit rule associated with the unit.

In some implementations, scope field 530 may include information that indicates a constraint associated with a unit (e.g., a limitation associated with the unit, a restriction associated with the unit, etc.). For example, scope field 530 may include information indicating that a first dimensionless ratio (e.g., a temperature ratio), associated with a first unit, may be multiplied by a second dimensionless ratio (e.g., a pressure ratio), associated with a second unit, but the first dimensionless ratio may not be added to the second dimensionless ratio (e.g., the temperature ratio may be multiplied by the pressure ratio, but the temperature ratio may not be added to the pressure ratio).

In some implementations, scope field 530 may include information that indicates a unit propagation rule associated with a unit. For example, scope field 530 may include information indicating that an input unit (e.g., inch/inch) may be put through a transcendental operation (e.g., a square root operation), but that the output unit, associated with the result of the operation, is not inherited from the input unit.

In this example, the unit propagation rule may indicate that the output unit may be an empty unit (e.g., the output of the square root operation does not have unit) and/or that the output unit is to be manually specified (e.g., specified by the user).

Unit property information, associated with a specific unit, may be conceptually represented as a single row in data structure 500. For example, the ninth row of data structure 500 may correspond to a specific unit, identified as Acme Horsepower, that may be abbreviated using a string of characters, hp-acme. As further shown in the ninth row of data structure 500, Acme Horsepower may be associated with a conversion factor of 725 W/hp-acme (e.g., 725 Watts per 1 Acme Horsepower), and may be associated with an abstract unit type of Power. As further shown, the ninth row of data structure 500 may indicate that Acme Horsepower is a subunit of horsepower, and that Acme-Horsepower is a user defined unit. Client device 210 may use one or more of the unit properties stored in the ninth row of data structure 500 to determine a unit rule, associated with Acme Horsepower, when client device 210 encounters an element associated with Acme Horsepower in a model.

As shown in FIG. 5B, data structure 535 may include a collection of fields associated with an abstract unit, such as an abstract unit name field 540, a definition field 545, and a specific unit field 550.

Abstract unit name field 540 may store information, associated with a unit property received by client device 210, that identifies an abstract unit. For example, abstract unit name field 540 may store a string of characters that identifies an abstract unit name, associated with the unit property, received by client device 210.

Definition field 545 may store information that identifies a unit property associated with defining the abstract unit, identified in abstract unit name field 540, using two or more other abstract units. For example, definition field 545 may include information that identifies a manner in which an abstract unit (e.g., Work) may be defined using two or more other abstract units (e.g., Force×Length=Work). In some implementations, definition field 545 may store an abbreviation associated with defining the abstract unit identified in abstract unit name field 545. In some implementations, definition field 545 may store a single line that includes information that defines the abstract unit identified in abstract unit name field 545 (e.g., velocity may be defined as $meter^1 second^{-1}$ or $m^1 s^{-1}$).

Specific unit field 550 may store information that identifies a unit property that identifies one or more specific units associated with the abstract unit identified in abstract unit name field 540. For example, specific unit field 550 may include information that indicates that each of a first specific unit (e.g., Pa), a second abstract unit (e.g., inHG), and a third abstract unit (e.g., an atmosphere ("atm")) are specific units associated with a particular abstract unit (e.g., pressure). In some implementations, specific unit field 550 may store information that identifies a default and/or preferred specific unit associated with the abstract unit identified in abstract unit name field 540. In some implementations, specific unit field 550 may be used to identify a unit property included in data structure 500. For example, client device 210 may determine, based on information stored in specific unit field 550, that an area is associated with a specific unit of square meters (e.g., $meter^2$), and client device 210 may determine another unit property (e.g., associated with a specific unit of meter) based on information stored in one or more fields of data structure 500.

Unit property information, associated with an abstract unit, may be conceptually represented as a single row in data structure 535. For example, the ninth row of data structure 535 may correspond to an abstract unit, identified as power, that may be defined by dividing an abstract unit of work by an abstract unit of time (e.g., "Work/Time"). As further shown in the ninth row of data structure 535, the abstract unit of power may be associated with one or more specific unit types, including a Watt and a horsepower.

Data structures 500 and 535 include fields 505-530 and 540-550 for explanatory purposes. In practice, data structures 500 and 535 may include additional fields, fewer fields, different fields, or differently arranged fields than those shown in FIGS. 5A and 5B and/or described herein with respect to data structures 500 and 535. In some implementations, data structure 500 and data structure 535 may be combined into a single data structure. Furthermore, while data structure 500 and data structure 535 are represented as tables with rows and columns, in practice, data structure 500 and data structure 535 may include any type of data structure, such as a linked list, a tree, a hash table, a database, or any other type of data structure. In some implementations, data structure 500 and data structure 535 may include information generated by a device and/or a component. Additionally, or alternatively, data structure 500 and data structure 535 may include information provided from another source, such as information provided by a user and/or information automatically provided by a device.

Figure 6:
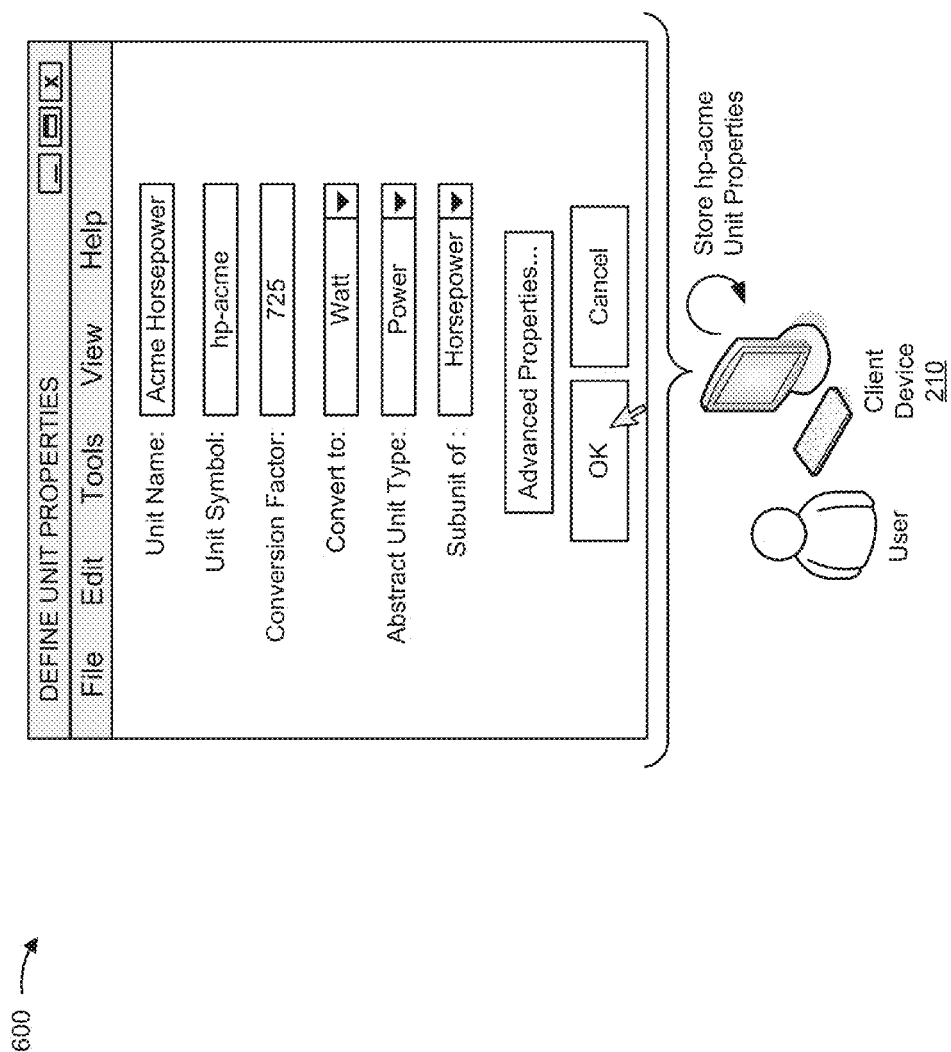
FIG. 6 is a diagram of an example implementation relating to the example process shown in FIG. 4.

FIG. 6 is a diagram of an example implementation 600 relating to the example process 400 shown in FIG. 4. For the purposes of example implementation 600, assume that a user, associated with a client device, wishes to define a unit (e.g., to be used in a model generated by the user) by providing one or more unit properties associated with the unit.

As shown in FIG. 6, the client device may provide (e.g., via a display screen associated with the client device) a user interface that may be used to define unit properties associated with a user-defined unit (e.g., a unit that is not known to client device 210), identified as Acme Horsepower. As further shown, the user may provide (e.g., via a text box) a unit name (e.g., Acme Horsepower) and a unit symbol (e.g., hp-acme) associated with the unit. As further shown, the user may provide (e.g., via a text box, via a drop down menu, etc.) information indicating that Acme Horsepower may be converted to Watts (e.g., a known unit) using a conversion factor of 725 (e.g., 1 hp-acme=725 Watts). The user may also provide (e.g., via a drop down menu) information indicating that Acme Horsepower is associated with an abstract unit type of power, and may provide information indicating that acme horsepower is a subunit of horsepower, as shown. As further shown, client device 210 may store the unit properties associated with Acme Horsepower (e.g., in data structure 500).

As indicated above, FIG. 6 is provided merely as an example. Other examples are possible and may differ from what was described with regard to FIG. 6.

Figure 7:
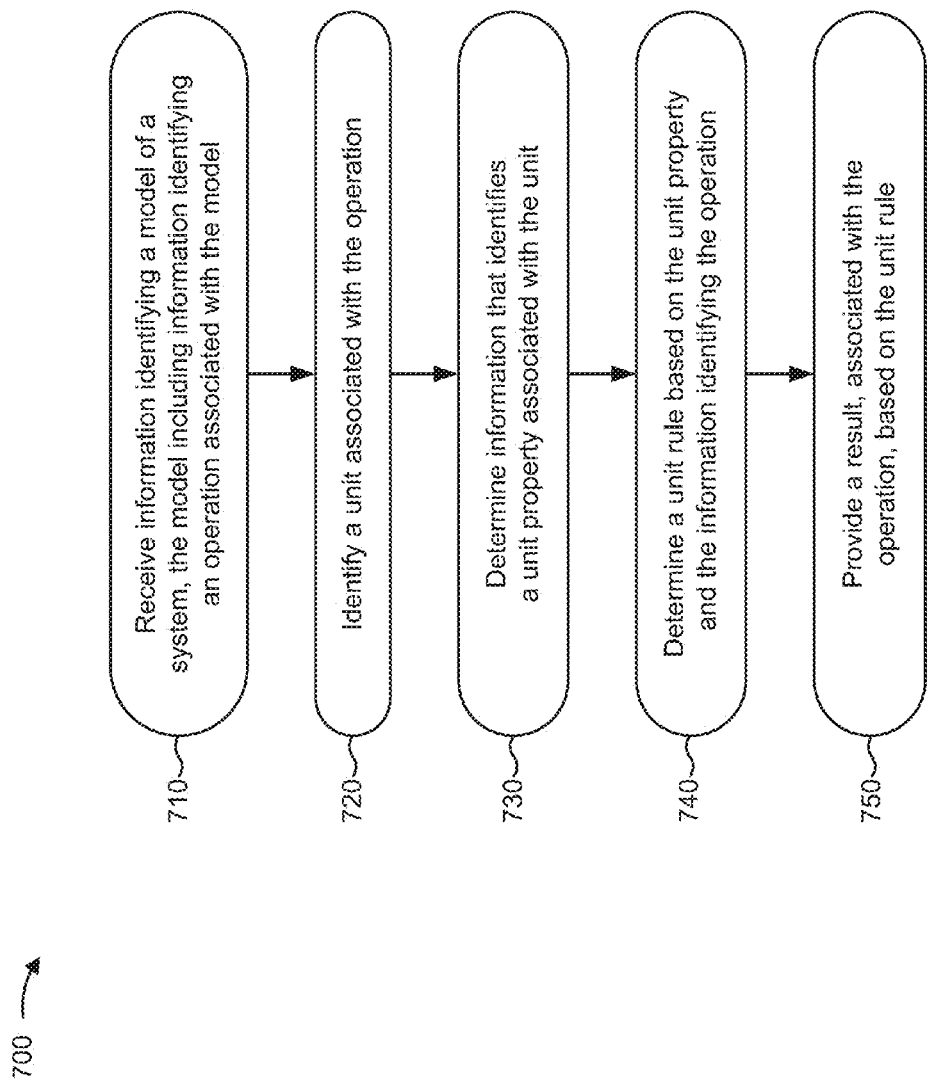
FIG. 7 is a flow chart of an example process for determining a unit rule, based on a unit property and an operation, and providing a result associated with the unit rule.

FIG. 7 is a flow chart of an example process 700 for determining a unit rule, based on a unit property and an operation, and providing a result associated with the unit rule. In some implementations, the process blocks of FIG. 7 may be performed by client device 210. In some implementations, one or more process blocks of FIG. 7 may be performed by another device or a group of devices separate from or including client device 210, such as server device 230.

As shown in FIG. 7, process 700 may include receiving information identifying a model of a system, the model including information identifying an operation associated with the model (block 710). For example, client device 210 may receive information that identifies the model from a user (e.g., via TCE 220) and/or from another device (e.g., server device 230). In some implementations, the user may interact with client device 210 (e.g., via TCE 220) to create, edit, and/or load the model. The model may include, for example, a block diagram model, a mathematical model, a flow chart, and/or program code that describes the model.

The model may include a set of elements that, when executed by client device 210 (e.g., TCE 220), simulate behavior of a system, such as a dynamic system, a natural system, a physical system, or the like. The model may generally correspond to a representation of interconnected nodes, where data dependencies, timing, ordering, and manners in which data is shared between nodes are well defined. A node may represent a computation implemented in the system (e.g., an element, of the system, that performs an operation associated with the computation), such as a computation performed on an input to generate an output.

An operation (e.g., associated with a node included in the model) may include a process or action, carried out by TCE 220, to be performed on one or more elements (e.g., an input signal, an input value, etc.) to provide a result (e.g., an output signal, an output value, etc.). For example, the operation may include a mathematical operation, such as an addition, a subtraction, a division, a multiplication, a function (e.g., solving an equation), a conversion (e.g., a unit conversion, etc.), a differentiation, an integration, or another type of operation.

As further shown in FIG. 7, process 700 may include identifying a unit associated with the operation (block 720). For example, client device 210 may identify a unit associated with the operation included in the model received by client device 210. In some implementations, client device 210 may identify the unit associated with the operation when client device 210 receives the information identifying the model (e.g., when the user loads the model, when the user creates an element, associated with the operation, included in the model, etc.). Additionally, or alternatively, client device 210 may identify the unit associated with the operation when client device 210 analyzes or executes the model.

In some implementations, client device 210 may identify the unit, associated with the operation, based on information identifying an input element associated with the operation. For example, the user may provide (e.g., via TCE 220) information identifying an input element (e.g., an input value), associated with the operation, that includes information identifying a unit (e.g., when the input value is associated with a particular unit), and client device 210 may identify the unit based on the information identifying the input element. As another example, TCE 220 may provide information identifying an input element, associated with the operation, that includes information identifying a unit (e.g., when TCE propagates information identifying the unit into the input element associated with the operation), and client device 210 may identify the unit based on the information provided by TCE 220.

In some implementations, client device 210 may identify the unit associated with the operation based on information identifying an output element associated with the operation. For example, the user may provide (e.g., via TCE 220) information identifying an output element (e.g., an output value, an output signal, etc.), associated with the operation (e.g., an addition block), that includes information identifying a unit (e.g., when the output value is designed to be associated with a particular unit), and client device 210 may identify the unit, associated with the operation, based on the information identifying the output element.

In some implementations, client device 210 may identify the unit, associated with the operation, based on information identifying a parameter associated with the operation. For example, client device 210 may receive the information identifying the operation (e.g., a block that identifies a function to be solved based out an input value) that includes a parameter (e.g., a parameter indicating the result of the function is to be associated with a particular unit), and client device 210 may identify the unit based on the information identifying the parameter. In some implementations, the user may specify the parameter. Additionally, or alternatively, TCE 220 may specify the parameter (e.g., a default parameter).

In some implementations, client device 210 may identify that there is no unit associated with the operation. For example, client device 210 may determine information identifying an input element, an output element, and/or a parameter associated with the operation, and client device 210 may determine that there is no unit associated with the input element, the output element, and/or the parameter. In some implementations, client device 210 may determine that there is no unit associated with the operation based on input from the user (e.g., when the user specifies that a particular element is not to be associated with a unit). In some implementations, client device 210 may provide (e.g., via a display screen) an indication (e.g., a warning, etc.) to the user based on identifying that there is no unit associated with the operation.

As further shown in FIG. 7, process 700 may include determining information that identifies a unit property associated with the unit (block 730). For example, client device 210 may determine information that identifies a unit property associated with the unit (e.g., the unit associated with the operation included in the model). In some implementations, client device 210 may determine the unit property when client device 210 identifies the unit associated with the operation. Additionally, or alternatively, client device 210 may determine the unit property when client device 210 analyzes or executes the model. Additionally, or alternatively, client device 210 may determine the unit property when client device 210 receives information, indicating that client device 210 may determine the unit property, from another device (e.g., server device 230).

In some implementations, client device 210 may determine the unit property based on information stored by client device 210 and/server device 230. For example, client device 210 may store information (e.g., data structure 500 and data structure 535) that includes a set of unit properties associated with the unit, and client device 210 may determine the information that identifies the unit property based on the information stored by client device 210 and/or server device 230.

Additionally, or alternatively, client device 210 may determine the unit property based on information received by client device 210. For example, client device 210 may receive, from the user, input associated with the unit property, and client device 210 may determine the unit property based on the information received from the user (e.g., client device 210 may prompt the user, via a user interface of TCE 220, to provide information identifying the unit property when client device 210 identifies the unit as being associated with the operation).

As further shown in FIG. 7, process 700 may include determining a unit rule based on the unit property and the information identifying the operation (block 740). For example, client device 210 may determine a unit rule based on the unit property and the information identifying the operation. In some implementations, client device 210 may determine the unit rule when client device 210 determines the information that identifies the unit property. Additionally, or alternatively, client device 210 may determine the unit rule when client device 210 analyzes the model. Additionally, or alternatively, client device 210 may determine the unit rule when client device 210 executes the model (e.g., when client device 210 is to perform the operation). Additionally, or alternatively, client device 210 may determine the unit rule when client device 210 receives information, indicating that client device 210 may determine the unit rule, from another device (e.g., server device 230).

A unit rule may include a rule that governs how client device 210 is to manage a unit associated with the operation. In some implementations, client device 210 may store (e.g., in a memory location of client device 210) information that identifies a set of unit rules (e.g., a default set of unit rules, a user defined set of unit rules, etc.) and client device 210 may determine the unit rule based on the set of unit rules stored by client device 210 and the unit property associated with the unit. For example, client device 210 may store information that identifies a default set of unit rules associated with an operation (e.g., an addition operation) involving two values associated with the same units (e.g., $m^2$) but of two different abstract unit types (e.g., area, permeability). In this example, the default unit rule may indicate that the two values associated with the same unit, but of different abstract unit types, may not be added. In some implementations, the user may provide (e.g., via TCE 220) information that identifies a new unit rule and/or modifies a stored unit rule, and client device 210 and/or server device 230 may store the information (e.g., in a data structure).

Additionally, or alternatively, client device 210 may store information that identifies a unit rule associated with determining an output unit of an operation, and client device 210 may determine the unit rule based on the unit rule associated with determining the output unit of the operation, and a unit property associated with the unit. For example, client device 210 may store information that identifies a unit rule associated with determining an output unit of an operation (e.g., a unit rule indicating that a first value associated with a first abstract unit divided by a second value associated with a second abstract unit is to result in a third value associated with a third abstract unit), and client device 210 may determine a unit rule, associated with the output of the operation, based on the output unit rule and a unit property associated with the operation (e.g., when a first value of abstract unit type force is divided by a second value of abstract unit type area, the output unit rule and the unit rule may indicate that the output of the operation is to be of abstract unit type pressure).

Additionally, or alternatively, client device 210 may store information that identifies an overriding rule associated with a unit rule, and client device 210 may determine the unit rule based on the overriding rule and the unit property associated with the unit. For example, client device 210 may store information that identifies a default unit rule (e.g., a default unit rule that indicates that two values, each associated with a different unit, may be multiplied), and client device 210 may store information that indicates that the default unit rule is to be overridden by an overriding rule in a particular situation (e.g., when the first value is associated with a first temperature unit, Kelvin, and a second value is associated with a second temperature unit, Rankine, the overriding rule may indicate that the first value may not be multiplied by the second value).

In some implementations, client device 210 may determine the unit rule based on a default unit rule, a unit rule associated with determining an output unit of an operation, an overriding unit rule, and a unit property associated with a unit. For example, client device 210 may determine (e.g., based on a default unit rule) that a first unit (e.g., meters), associated with a first abstract unit type (e.g., length), may be divided by a second unit (e.g., seconds), associated with a second abstract unit type (e.g., time), may determine (e.g., based on the unit rule associated with determining the output unit of the operation) that the output unit is to be a ratio of the first unit to the second unit (e.g., meters/second) and is to be associated with a third abstract unit type (e.g., velocity), and may determine (e.g., based on an overriding unit rule) that the preferred unit for the third abstract unit type (e.g., velocity) is a third unit (e.g., miles per hour). In this example, client device 210 may determine a unit rule indicating that the operation (e.g., meters divided by seconds) is to result in an output associated with the third unit (e.g., miles per hour), and client device 210 may apply the unit rule, accordingly.

In some implementations, the unit rule may be based on information associated with one or more unit properties (e.g., one or more specific unit properties, one or more abstract unit properties, etc.) associated with one or more units included in the model. For example, client device 210 may determine information that identifies a first unit property (e.g., associated with a first unit), may determine information that identifies a second unit property (e.g., associated with a second unit), and may determine a unit rule (e.g., stored by client device 210) associated with managing the first unit and/or the second unit (e.g., when the first unit and the second unit may be associated with the operation included in the model).

Additionally, or alternatively, the unit rule may be based on information associated with the operation included in the model. For example, client device 210 may determine (e.g., based on information stored by client device 210) a unit rule that indicates that a first value, associated with a first unit, cannot be added to a second value, associated with a second unit, based on information associated with the operation (e.g., when the operation indicates that the first value is designed to be added to the second value).

In some implementations, the unit rule may govern how client device 210 is to manage the unit based on unit properties associated with one or more abstract units. For example, the unit rule may indicate that performing an operation (e.g., a division) using a first input, associated with a first abstract unit type (e.g., a length), and a second input, associated with a second abstract unit type (e.g., time), results in an output associated with a third abstract unit type (e.g., velocity). As another example, the unit rule may indicate that an output, associated with an abstract unit type (e.g., area), is configured to be converted to a preferred and/or preselected specific unit and displayed (e.g., to the user) in terms of the preferred and/or preselected specific unit (e.g., $meter^2$ rather than $foot^2$, etc.). As an additional example, the unit rule may indicate that an output, associated with an abstract unit type (e.g., area), is configured to be displayed in terms of a preferred and/or preselected unit prefix (e.g., $kilometer^2$ rather than $meter^2$, $centimeter^2$, etc.). As yet another example, the unit rule may indicate that a first value associated with a specific unit (e.g., $meter^2$) may (or may not) be manipulated using a second value associated with the specific unit based on information indicating that the first value and the second value are associated with different abstract units (e.g., square meters of abstract unit area may not be added to square meters of abstract unit permeability, degrees of abstract unit angle may not be added to seconds of abstract unit time, degrees of abstract unit angle may be added to seconds of abstract unit angle, etc.). As a final example, the unit rule may indicate that a value associated with an abstract unit may (or may not) be received by an element of the model (e.g., when a block is designed to receive only values associated with abstract unit velocity, etc.)

In some implementations, the unit rule may govern how to manage the unit based on unit properties of elements associated with dimensionless quantities. For example, the unit rule may indicate that client device 210 is to identify an element (e.g., an input element, an output element, etc.) as a dimensionless quantity (e.g., a temperature ratio, a pressure ratio, etc.), and may indicate that client device 210 is to track a unit associated with a numerator and/or a denominator of the dimensionless quantity (e.g., a temperature ratio may be tracked as ° C./° C., a pressure ratio may be tracked as Pa/Pa). As an additional example, the unit rule may indicate that an element associated with a dimensionless quantity (e.g., a Reynolds number, a Prandtl number, etc.) may (or may not) be used in a particular manner (e.g., the unit rule may indicate that a Reynolds number may be multiplied by a Prandtl number, the unit rule may indicate that a Reynolds number may not to be added to a Prandtl number, the unit rule may indicate that a particular block cannot receive a Reynolds number but can receive a Prandtl number, etc.).

In some implementations, the unit rule may govern how to manage the unit based on a unit property associated with a sub-unit. A sub-unit may include a specific unit that may fit into a category of another specific unit (e.g., metric horsepower is a sub-unit of horsepower, etc.). For example, the unit rule may indicate that a first input value, associated with a first sub-unit (e.g., metric horsepower) of a unit (e.g., horsepower), may be added to a second input value, associated with a second sub-unit (e.g., mechanical horsepower) of the unit only after the first input value is converted to the second sub-unit of the unit (e.g., when mechanical horsepower is the preferred sub-unit of horsepower). In this example, client device 210 may determine that the first sub-unit and the second sub-unit are associated with the same unit, and may determine (e.g., based on information stored by client device 210) that the second sub-unit is the preferred sub-unit of the unit.

In some implementations, the unit rule may govern how to manage the unit based on a unit property associated with a partial unit. A partial unit may include a unit that requires additional information when performing an operation associated with the unit (e.g., only partial information, associated with the unit, is stored by client device 210). For example, the unit rule may indicate that a value associated with a first unit (e.g., inHg) may be converted to a second unit (e.g., Pa) only when additional information (e.g., a Celsius temperature ("° C.")) is known (e.g., since converting inHg to Pa depends on ° C.). As another example, the unit rule may indicate that a value associated with a first unit (e.g., dollars ("$")) may be converted to a second unit (e.g., Euros ("€")) only when additional information (e.g., a currency exchange rate) is known (e.g., since the currency exchange rate may fluctuate). In some implementations, the unit rule may indicate that client device 210 is to receive information (e.g., associated with converting a first unit to a second unit) from a current external input and/or data source. For example, the model may indicate, via a conversion block, that client device 210 is to convert an input, in U.S. dollars ("$"), to provide an output, in Euros ("€"). In this example, the conversion block may be configured to receive a data feed that indicates a current exchange rate (e.g., since the exchange rate from $ to € may fluctuate).

In some implementations, the unit rule may govern how to manage the unit based on a unit property associated with an enumerated unit. An enumerated unit may include a unit that consists of a specific set of measures (e.g., compass points, such as north, south, east, west, northeast, southwest, etc.). For example, the unit rule may indicate that client device 210 may perform an operation, associated with the enumerated unit (e.g., adding a first input, "north," to a second input, 12 degrees), only after client device 210 converts a value, associated with the enumerated unit, to a numerical value (e.g., north may be converted to 0 degrees and may be added to 12 degrees). As another example, the unit rule may indicate that a numerical unit trumps an enumerated unit when an operation, associated with the enumerated unit and the numerical unit, is performed (e.g., when "west" is designed to be added to a quantity of degrees, an output is to be a quantity of degrees).

In some implementations, the unit rule may govern how to manage the unit based on a unit property associated with a user preference and/or a particular set of units. For example, the user may indicate (e.g., via TCE 220) that one or more units, included in the model, are to be provided in terms of a selected set of units (e.g., the user may indicate that the user prefers force to be given in kilopounds ("kip") and that pressure is to be provided in kilopascals ("kPa"), and the client device 210 may provide the units based on the selected set of units. In some implementations, the unit rule may indicate that client device 210 is to provide the unit in terms of a preferred unit only when an output, associated with the unit, may yield a numerically bad result (e.g., when a conversion to the preferred unit is not supported by a datatype associated with the signal, etc.).

In some implementations, the unit rule may govern how to manage the unit based on a unit property associated with an origin of the unit. For example, the unit rule may indicate that client device 210 is to provide, to the user, an indication when a user defined and/or approximate (e.g., an approximation to a certain precision, etc.) unit is used in association with an operation included in the model. As an additional example, a unit property may indicate whether a unit can be traced to provenance (e.g., whether the unit is recognized by a standards body, such as the Bureau International des Poids et Mesures ("BIPM"), the National Institute of Standards and Technology ("NIST"), the Society of Automotive Engineers ("SAE"), the American Society of Mechanical Engineers ("ASME"), etc.), and the unit rule may indicate, based on the provenance associated with the unit, whether the unit may be propagated to one or more other elements included in the model. As one example, if the unit can be traced to provenance associated with an acceptable standards body organization (e.g., BIPM), then the unit rule may indicate that the unit may be propagated to the one or more other elements included in the model. As another example, if the unit property cannot be traced to provenance (e.g., the unit is not recognized by any standards body) or can be traced to provenance associated with an unacceptable standards body (e.g., when the unit can be traced to provenance based on an SAE specification, but the model requires the unit to be traced to provenance based on an NIST specification), then the unit rule may indicate that the unit cannot be propagated to other elements included in the model. In some implementations, the client device 210 may trace a unit to provenance via a relationship with one or more other units. For example, client device 210 may determine that 1 foot is legally defined as 12 inches (e.g., with no approximation), that 1 inch is legally defined as 2.54 centimeters, that 1 centimeter is one one-hundredth of a meter, and that a meter has provenance. In this example, the foot unit has full provenance as specified by the BIPM (e.g., since the foot unit can be exactly traced to the meter unit recognized by the BIPM).

In some implementations, the unit rule may govern how to manage the unit based on information associated with an empty unit parameter associated with the operation. For example, the model may indicate that a first value, associated with a unit (e.g., Watts) is to be multiplied by a second value, and client device 210 may determine that the model does not include information indicating that the second value is associated with a unit (e.g., the second value may be a constant). In this example, the unit rule (e.g., associated with the Watt unit) may indicate that client device 210 is to permit the first value to be multiplied by the second value, and may also indicate that client device 210 is to provide (e.g., to the user) an indication that the second value is not associated with a unit. As an additional example, the operation may indicate (e.g., based on user input) that a first unit, associated with an input value, may be ignored when performing the operation (e.g., evaluating a polynomial based on the input), and that a second unit is to be associated with an output value, (e.g., a result of evaluating the polynomial). In this example, the unit rule may indicate that the first unit may be ignored and the second unit is to be associated with the result of performing the operation (e.g., units are to be ignored while evaluating the polynomial).

In some implementations, the unit rule may govern how to manage the unit based on a design minimum and a design maximum ("design min-max") associated with a value. For example, client device 210 may determine information that identifies a unit associated with a value, information that identifies a datatype associated with the value, and information that identifies a design min-max associated with the value. Based on the unit, the datatype, and/or the design min-max, client device 210 may determine a unit rule that identifies a default unit prefix associated with the value. Additionally, or alternatively, client device 210 may detect a datatype error indicating the unit is incompatible with the data type associated with the value. For example, client device 210 may determine that a data type, associated with a value, is an 8-bit signed integer, that a unit, associated with the value, is microstrain (e.g., $1 \times 10^{-6}$ inch/inch), and that a design min-max, associated with the value is $-1.28 \times 10^{-4}$ to $1.27 \times 10^{-4}$. In this example, client device 210 may determine that an integer range (e.g., $-128$ to $127$), associated with the datatype, is incorrectly specified as being equivalent to a real-world value range of $-1.2207 \times 10^{-4}$ to $1.2112 \times 10^{-4}$ microstrain (e.g., rather than strain). As such, client device 210 may detect a datatype error that, if uncorrected, may cause all values in the integer range to map to zero (e.g., $-1.2207 \times 10^{-4}$ microstrain will map to zero, $1.2112 \times 10^{-4}$ microstrain will map to zero). In this example, client device 210 may determine a unit rule associated with managing and/or correcting the datatype error.

As an additional example, the unit rule may indicate that a value may not be converted from a first unit, associated with a first design min-max, to a second unit, associated with a second design min-max, when a datatype, associated with the value, may not support the conversion (e.g., when an 8-bit datatype may be insufficient to store a second value that may be converted from a first value).

In some implementations, the unit rule may govern how to manage the unit based on a unit property identifying a unit as an active unit or an inactive unit. For example, a first unit property (e.g., defined by the user), associated with a first unit, may indicate that the first unit is an active unit (e.g., that the unit is to be taken into account when performing an operation associated with the unit). As an additional example, and a second unit property (e.g., defined by the user), associated with a second unit, may indicate that the second unit is an inactive unit (e.g., that the second unit may be ignored when performing an operation associated with the second unit). In some implementations, the user may specify a portion of the model (e.g., a block, a group of blocks, etc.) that is to include only inactive units (e.g., the user can specify an inactive unit block, an inactive unit zone that includes a group of blocks, etc.).

In some implementations, client device 210 may determine another type of unit rule (e.g., the listed examples of unit rules are not exhaustive of all possible unit rules) based on one or more unit properties and/or one or more operations included in the model. Additionally, or alternatively, the unit rule may be determined based on unit properties and/or operations associated with one or more units.

As further shown in FIG. 7, process 700 may include providing a result, associated with the operation, based on the unit rule (block 750). For example, client device 210 may provide a result, associated with the operation, based on the unit rule determined by client device 210. In some implementations, client device 210 may provide the result when client device 210 determines the unit rule. Additionally, or alternatively, client device 210 may provide the result when client device 210 analyzes or executes the model. Additionally, or alternatively, client device 210 may provide the result when client device 210 receives information, indicating that client device 210 may provide the result, from the user and/or another device (e.g., server device 230).

In some implementations, client device 210 may provide the result in the form of an output element. For example, client device 210 may determine a unit rule associated with an operation to be performed on an input value, and client device 210 may provide a result (e.g., an output value) based on performing the operation and based on applying the unit rule.

Additionally, or alternatively, client device 210 may provide the result in the form of an indication. For example, client device 210 may determine the unit rule, and the unit rule may indicate client device 210 is to provide an indication (e.g., a flag, a warning, etc.) to the user of client device 210. In this example, client device 210 may provide the indication to the user via TCE 220 (e.g., by displaying a pop-up window, by displaying a string of text in the model, etc.).

Additionally, or alternatively, client device 210 may provide the result in the form of a unit error. For example, client device 210 may determine the unit rule, associated with the unit, and may determine that an operation, associated with the unit, has failed (e.g., when the unit rule indicates that the operation is not to be performed, when the unit rule indicates that a result of the operation may not be determined, etc.). In this example, client device 210 may determine that a unit error has occurred, and may provide, to the user, the result indicating that the unit error has occurred.

Additionally, or alternatively, client device 210 may provide the result in the form of a report to be provided to the user of client device 210. For example, client device 210 may determine results, associated with executing a model, and may provide the results in the form of a report (e.g., a list of unit conversions, a quantity of unit conversions, etc.) that may be viewed by the user (e.g., to allow the user to determine an operation cost associated with the unit conversions in the model).

In some implementations, the result may allow the user to determine a manner in which to modify an element of the model to resolve and/or correct a unit issue. In this manner, client device 210 may determine one or more unit rules that may govern how client device 210 may manage one or more units included in a model, and/or client device 210 may prevent, detect, and/or warn against unit related issues associated with the one or more units.

Although FIG. 7 shows example blocks of process 700, in some implementations, process 700 may include additional blocks, different blocks, fewer blocks, or differently arranged blocks than those depicted in FIG. 7. Additionally, or alternatively, two or more of the blocks of process 700 may be performed in parallel.

FIGS. 8A-8H are diagrams of an example implementation 800 relating to the example process shown in FIG. 7. For the purposes of example implementation 800, assume that a user of client device 210 has created a series of models that each include at least one input element (e.g., an input block associated with a unit), an operation (e.g., a block configured to perform an operation on the at least one input element) and an output element (e.g., an output block, associated with a unit, that is positioned to receive the result of the operation). Further, assume that client device 210 stores information that identifies a set of units and a set of unit properties associated with each unit of the set of units.

Figure 8A:
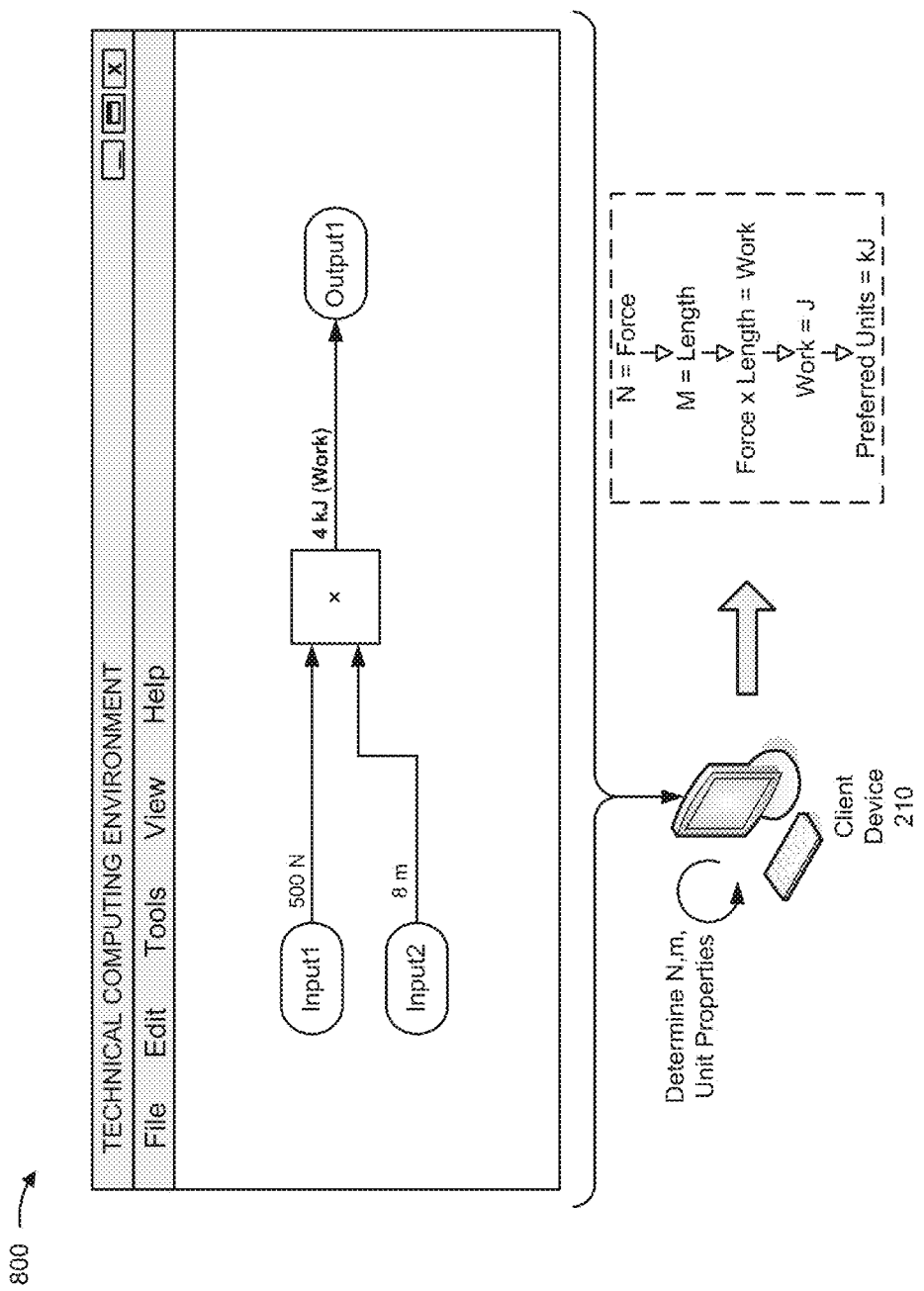
FIGS. 8A-8H are diagrams of an example implementation relating to the example process shown in FIG. 7.

As shown in FIG. 8A, a model may include a first input block, Input1, that may provide a first input value of 500 Newtons, and a second input block, Input2, that may provide a second input value of 8 meters. As shown, client device 210 may determine unit properties associated with each unit (e.g., a Newton is of abstract unit force, a meter is of abstract unit length).

As further shown in FIG. 8A, client device 210 may determine (e.g., based on information stored by client device 210) a unit rule associated with an output of a multiplication operation included in the model. For example, client device 210 may determine that force, when multiplied by length, results in work, may determine that work is to be associated with a unit of joules ("J") (e.g., joules are the default unit of work), and may determine that the preferred prefix (e.g., based on a user specified preference) of an output value associated with joules is kilojoules ("kJ"). As further shown, client device 210 may provide a result associated with the unit rule by providing an output signal indicating 4 kilojoules (e.g., 500 N×8 m=4000 J=4 kJ) result from the operation, and by indicating that work is the abstract unit associated with the output signal.

Figure 8B:
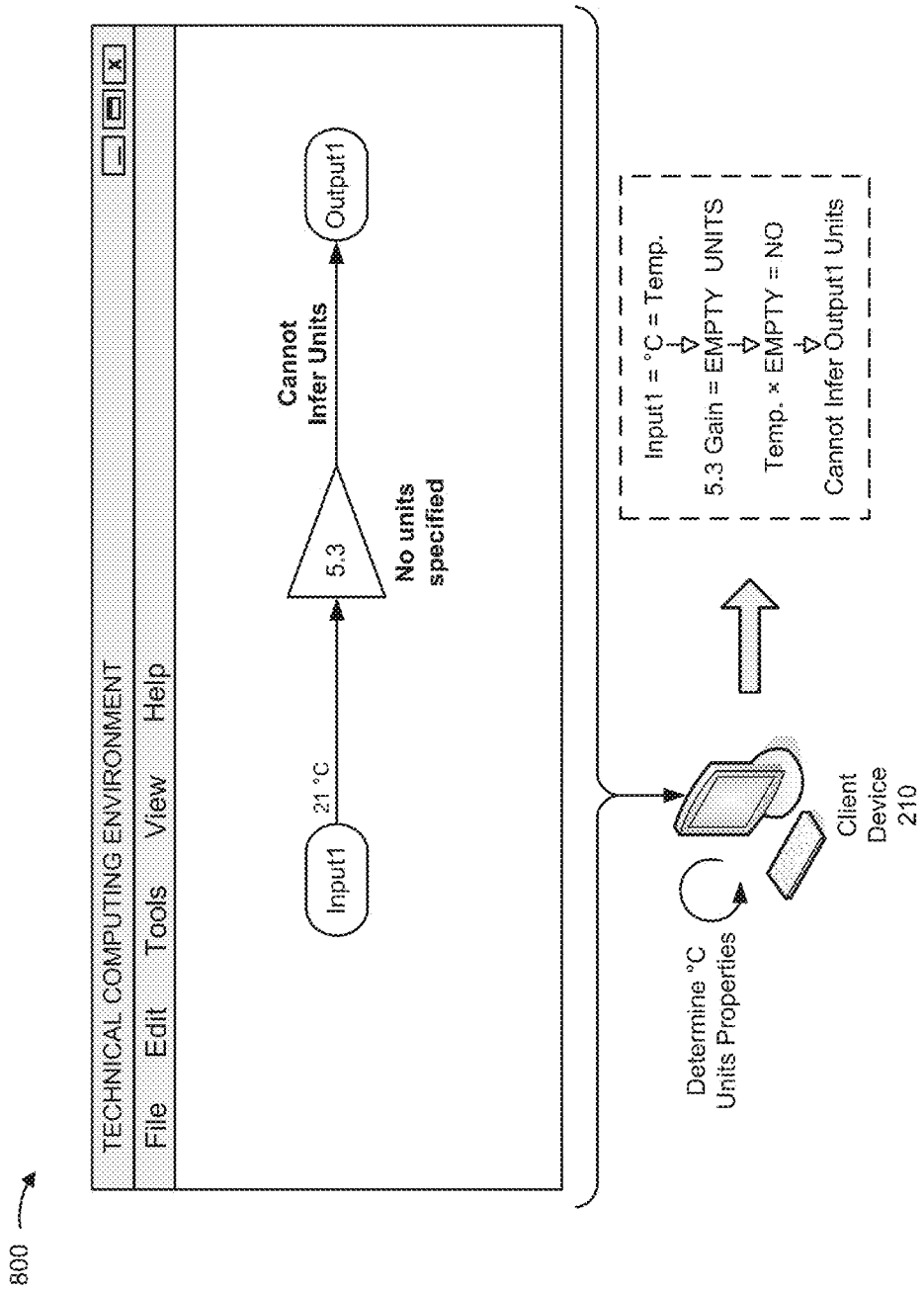

As shown in FIG. 8B, a model may include an input block, Input1, that may provide an input temperature of 21° C., that is designed to be multiplied by a fixed value (e.g., 5.3), using a gain block, to produce an output, Output1. As shown, client device 210 may determine unit properties associated with the Celsius unit (e.g., Celsius is of an abstract unit of temperature) and the gain block (e.g., that no units are specified within the gain block).

As further shown in FIG. 8B, client device 210 may determine (e.g., based on information stored by client device 210) a unit rule associated with an output of the gain block included in the model. For example, client device 210 may determine that a temperature may not be multiplied by a value that is not associated with a unit (e.g., since client device 210 cannot determine a unit that is to be associated with Output1). As further shown, client device 210 may provide a result associated with the unit rule by displaying a message indicating that client device 210 cannot infer the units of Output1, and by displaying a warning that no units are specified within the gain block included in the model.

Figure 8C:
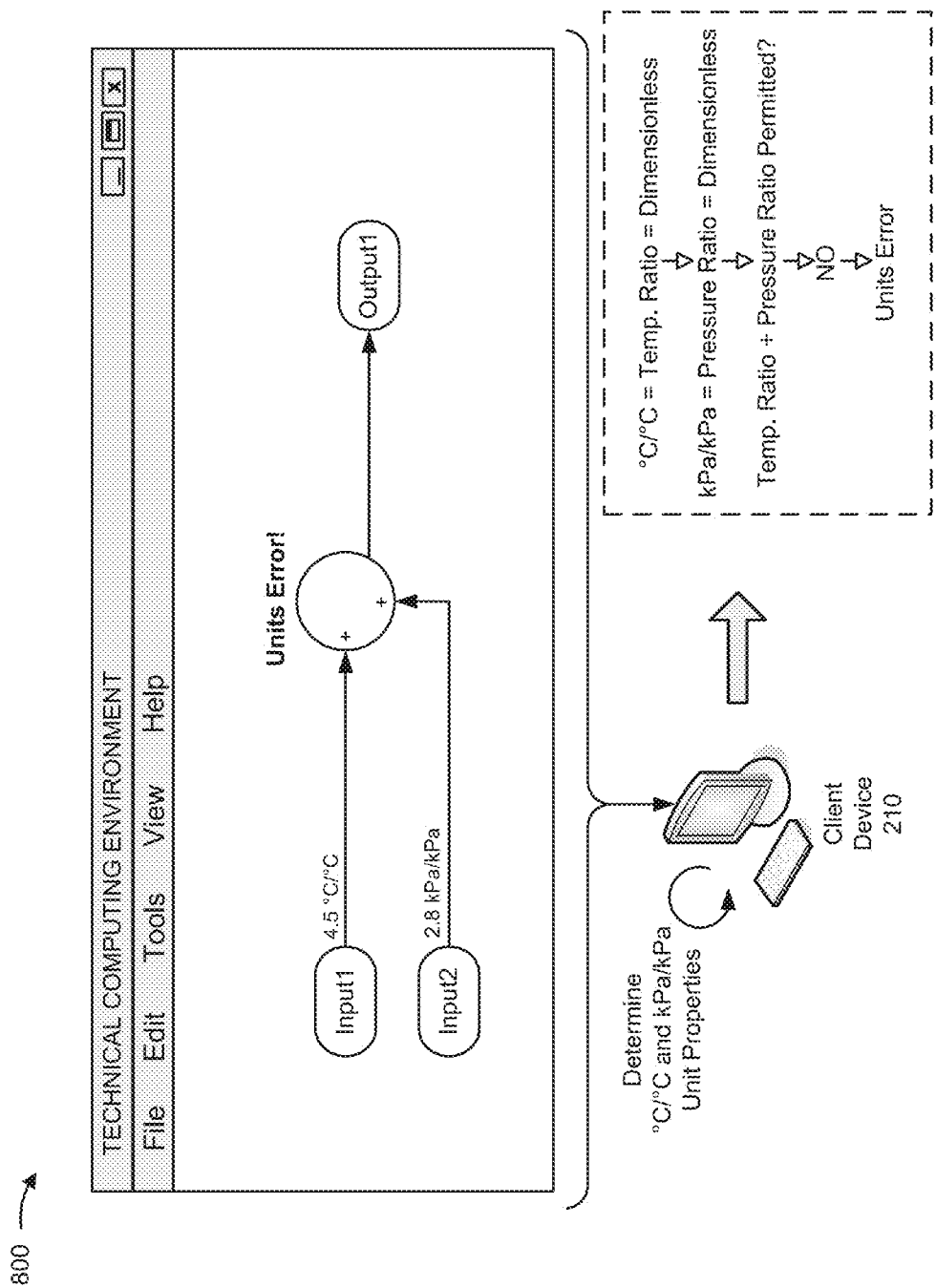

As shown in FIG. 8C, a model may include a first input block, Input1, that may provide a first input value of 4.5 degrees Celsius per degree Celsius ("° C./° C."), and a second input block, Input2, that may provide a second input value of 2.8 kilopascals per kilopascal ("kPa/kPa"). As shown, client device 210 may determine unit properties associated with each unit (e.g., ° C./° C. is a temperature ratio, kPa/kPa is a pressure ratio).

As further shown in FIG. 8C, client device 210 may determine (e.g., based on information stored by client device 210) a unit rule associated with an addition operation included in the model. For example, client device 210 may determine that a temperature ratio and a pressure ratio are dimensionless quantities (e.g., since the unit, associated with each ratio, may be cancelled using dimensional analysis), and may determine that client device 210 is to propagate the units associated with each ratio. Client device 210 may also determine that the temperature ratio and the pressure radio may not be added (e.g., since the temperature ratio and the pressure ratio are associated with the different abstract unit types). In this way, client device 210 may track dimensionless quantities (e.g., by recognizing that 4.5° C./° C. is a temperature ratio rather than a unitless value, by recognizing that 2.8 kPa/kPa is a pressure ratio rather than a unitless value). As further shown, client device 210 may provide a result associated with the unit rule by providing an error message (e.g., indicating that Input1 and Input2 may not be added) rather than providing an output value associated with the addition.

Figure 8D:
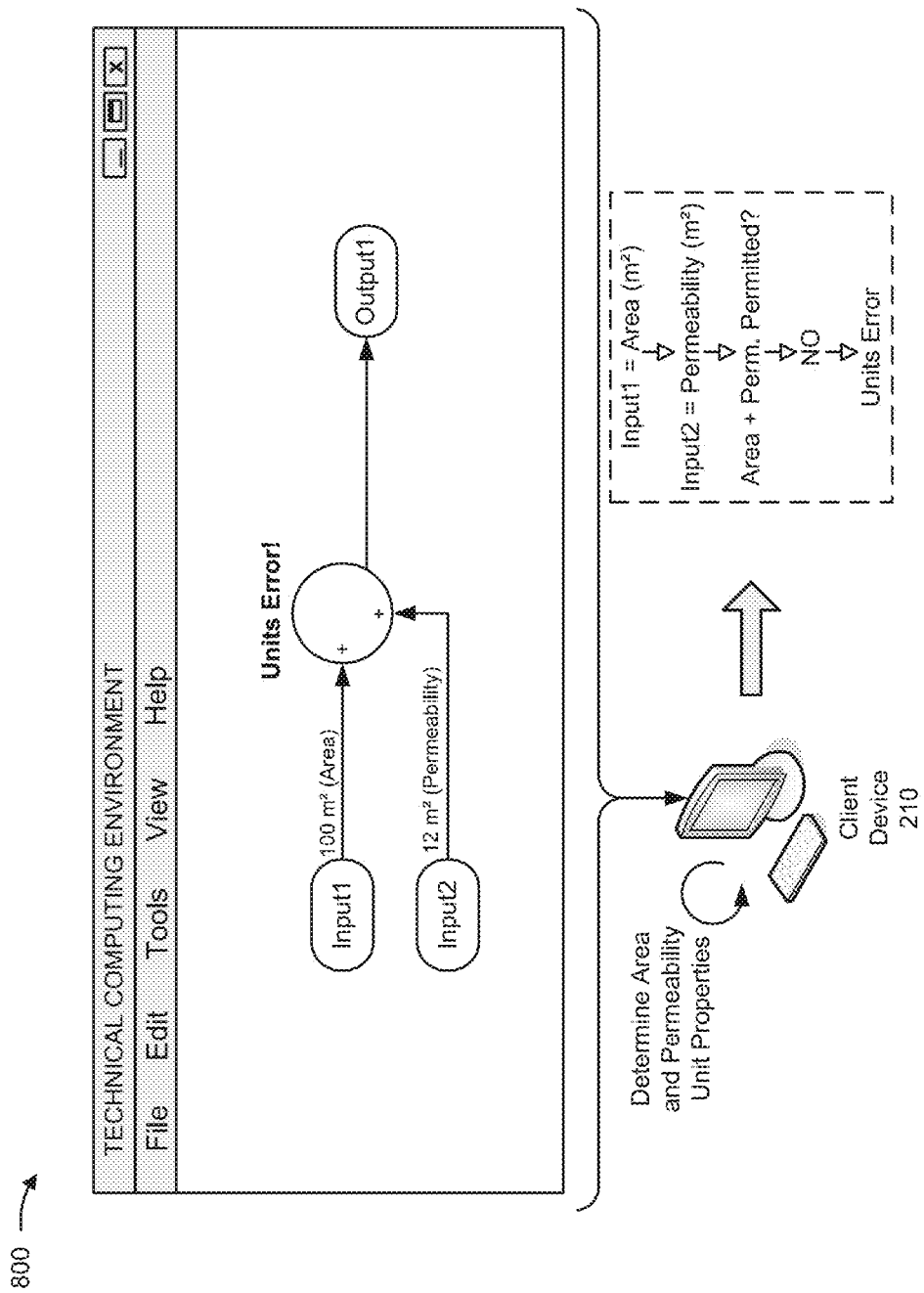

As shown in FIG. 8D, a model may include a first input block, Input1, that may provide a first input value of 100 square meters associated with an abstract unit of area, and a second input block, Input2, that may provide a second input value of 12 square meters associated with an abstract unit of permeability. As shown, client device 210 may determine unit properties associated with each input (e.g., that Input1 is of abstract unit area and the Input2 is of abstract unit permeability).

As further shown in FIG. 8D, client device 210 may determine (e.g., based on information stored by client device 210) a unit rule associated with an output of an addition operation included in the model. For example, client device 210 may determine that an area and a permeability cannot be added (e.g., even when the quantities are both in terms of square meters). As further shown, client device 210 may provide a result associated with the unit rule by providing an error message (e.g., indicating that Input1 and Input2 may not be added) rather than providing an output value associated with the addition.

Figure 8E:
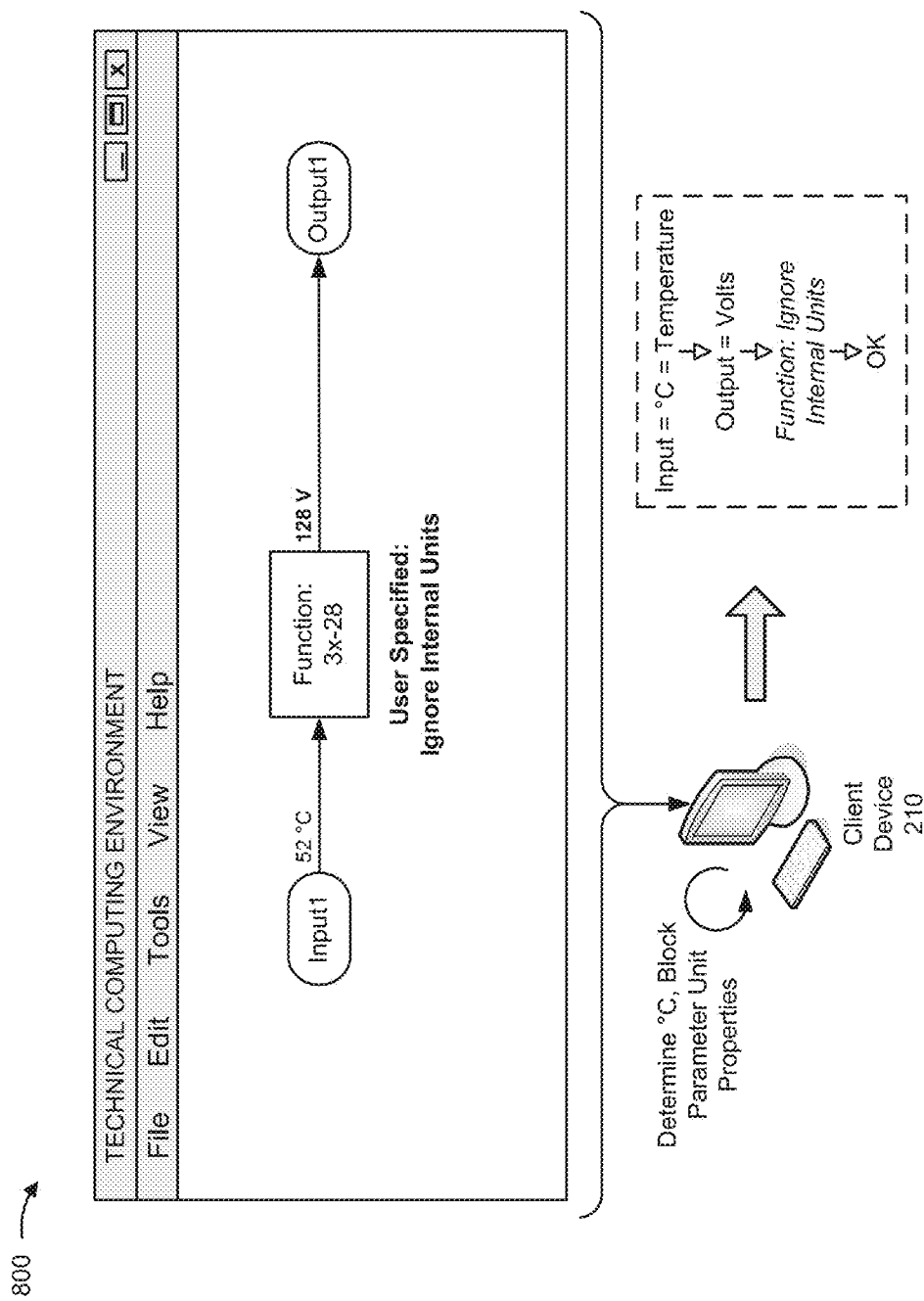

As shown in FIG. 8E, a model may include an input block, Input1, that may provide an input temperature of 52° C., that is designed to be used to evaluate a function to produce an output, Output1, in volts. As shown, client device 210 may determine unit properties associated with the Celsius unit (e.g., Celsius is of an abstract unit of temperature) and the function (e.g., that the user has specified that units are to be ignored when evaluating the function, that volts are to be the units associated with the output of the function).

As further shown in FIG. 8E, client device 210 may determine (e.g., based on information stored by client device 210) a unit rule associated with an output of the function included in the model. For example, client device 210 may determine that, based on the user specified function block (e.g., indicating units are to be ignored), client device 210 may evaluate the function and may provide Output1 (e.g., unit properties associated with managing the Celsius unit, the temperature abstract unit, and or the volts unit may be ignored). As further shown, client device 210 may provide a result associated with the unit rule by displaying an indication that the user specified that units are to be ignored, and client device 210 may provide a result associated with evaluating the function (e.g., (3×52° C.)−28=128 V).

Figure 8F:
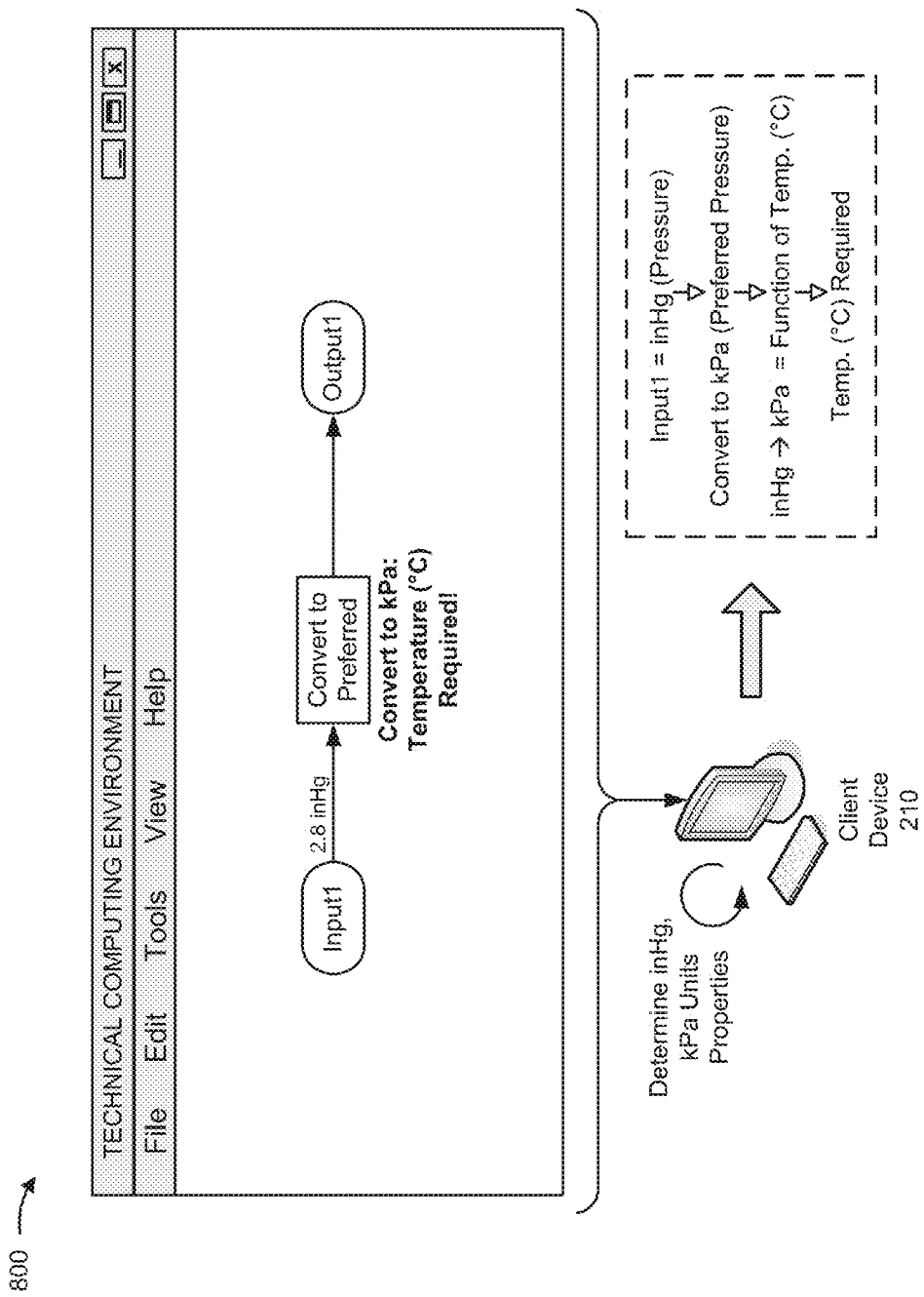

As shown in FIG. 8F, a model may include an input block, Input1, that may provide an input of 2.8 inHg, that is designed to be converted (e.g., via a conversion block) to a preferred unit and provided to an output element, Output1. As shown, client device 210 may determine unit properties associated with the inHg unit (e.g., pressure is the abstract unit of inHg, kPa is a preferred unit of pressure, and converting inHg to kPa depends on a Celsius temperature).

As further shown in FIG. 8F, client device 210 may determine (e.g., based on information stored by client device 210) a unit rule associated with the conversion block included in the model. For example, client device 210 may determine that Input1 is to be converted to kPa, but may also determine that Input1 may not be converted from inHg to kPa unless a Celsius temperature is known. As further shown, client device 210 may provide a result associated with the unit rule by displaying an error message indicating that Input1 is to be converted to kPa, and that client device 210 cannot convert Input1 to kPa without information identifying a Celsius temperature.

Figure 8G:
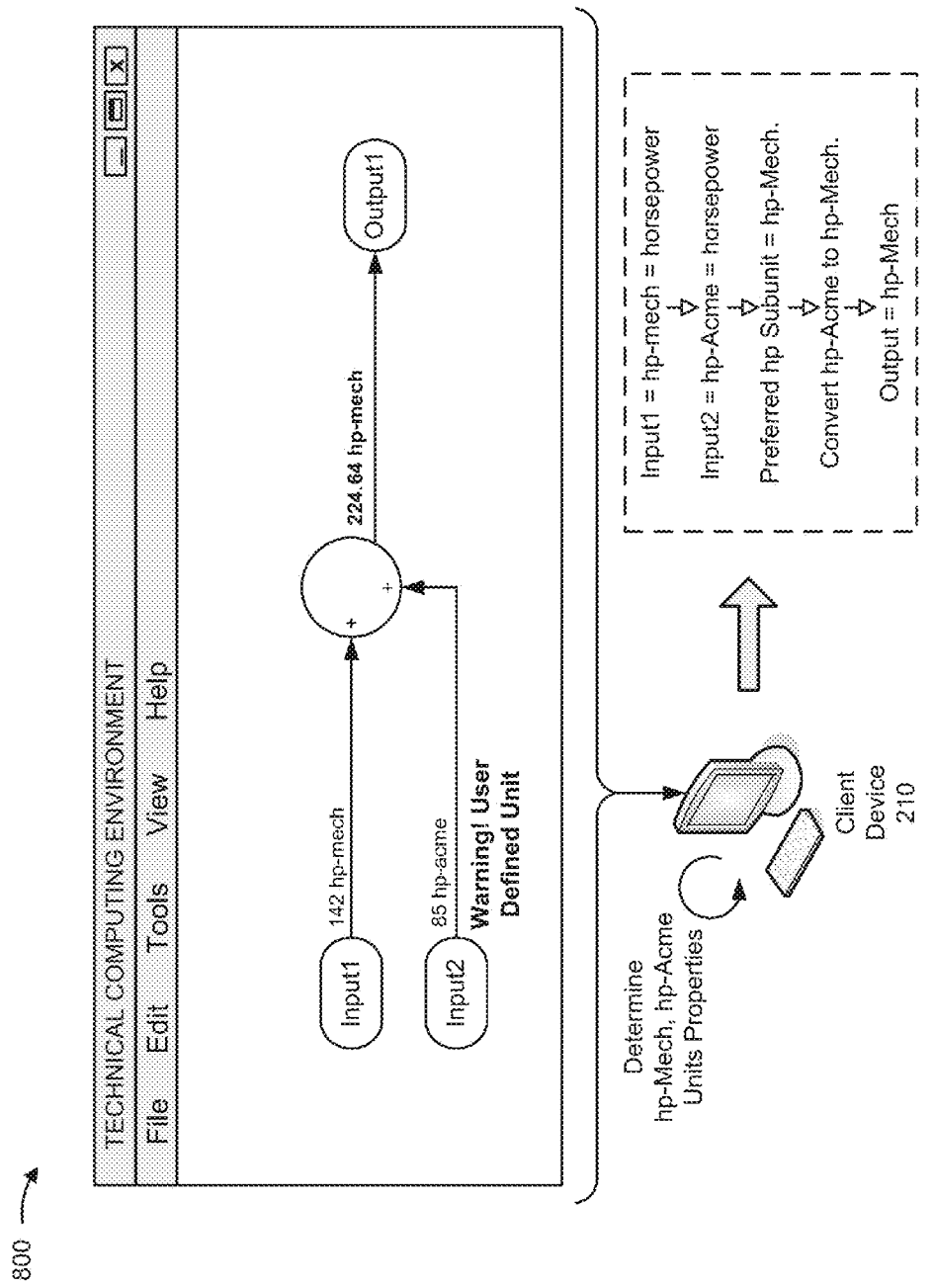

As shown in FIG. 8G, a model may include an input block, Input1, that may provide an input of 142 mechanical horsepower ("hp-mech"), and a second input block, Input2, that may provide an input value of 85 acme horsepower ("hp-acme"). As shown, client device 210 may determine unit properties associated with each unit (e.g., hp-mech and hp-acme are sub-units of horsepower, hp-mech is the preferred sub-unit of horsepower, and hp-acme is a user defined unit).

As further shown in FIG. 8G, client device 210 may determine (e.g., based on information stored by client device 210) a unit rule associated with an output of an addition operation included in the model. For example, client device 210 may determine that an hp-mech value and an hp-acme value may be added (e.g., since both are sub-units of horsepower), but only when hp-acme is converted to hp-mech (e.g., since hp-mech is the preferred sub-unit). As further shown, client device 210 may provide a result associated with the unit rule by converting Input2 to hp-mech (e.g., 85 hp-acme×725 W/hp-acme=61625 W×1 hp-mech/745.70 W=82.64 hp-mech), performing the addition (e.g., 142 hp-mech+82.64 hp-mech=224.64 hp-mech), and providing an output value. As also shown, client device 210 may display a warning associated with Input2 (e.g., since hp-acme is a user defined unit).

Figure 8H:
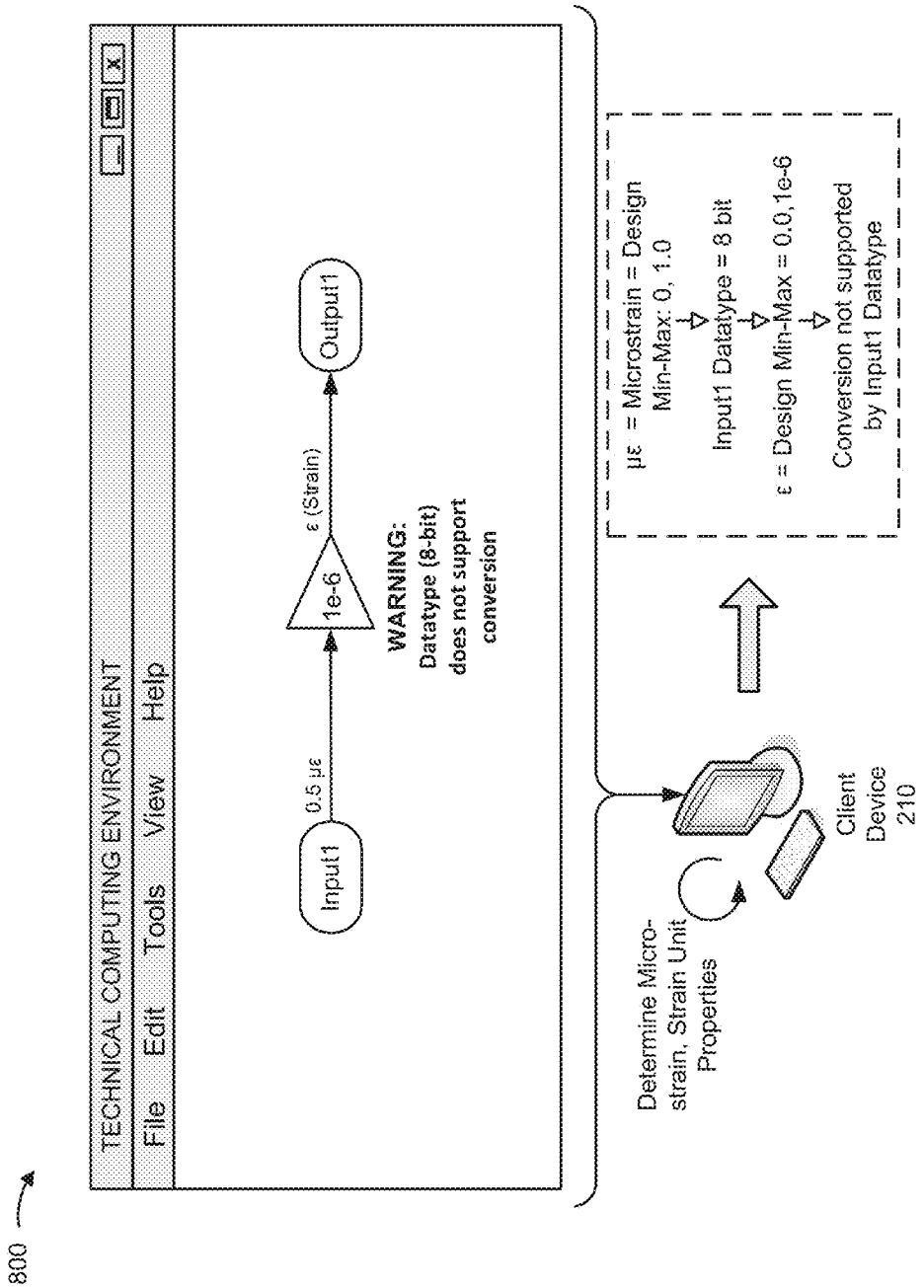

As shown in FIG. 8H, a model may include an input block, Input1, that may provide a micro-strain of 0.5µε, that is designed to be converted (e.g., via a conversion block) to strain and provided to an output element, Output1. As shown, client device 210 may determine unit properties associated with the micro-strain unit and the strain unit (e.g., a design min-max for micro-strain is 0 to 1, a datatype of the micro-strain input is an 8-bit datatype, a design min-max for strain is 0.0 to 1e-6).

As further shown in FIG. 8H, client device 210 may determine (e.g., based on information stored by client device 210) a unit rule associated with the micro-strain unit and the conversion block included in the model. For example, client device 210 may determine that Input1 may not be converted from micro-strain to strain since the datatype (e.g., used to store Input1 and Output1) is an 8-bit datatype (e.g., use of the 8-bit datatype will always result in a value of zero when converting to strain). As further shown, client device 210 may provide a result associated with the unit rule by displaying a message indicating that Input1 may not be converted from micro-strain to strain (e.g., since the 8-bit datatype is insufficient to store a value associated with converting micro-strain to strain).

As indicated above, FIGS. 8A-8H are provided merely as examples. Other examples are possible and may differ from what was described with regard to FIGS. 8A-8H.

Implementations described herein may allow a client device to manage a unit, included in a model, and may also allow the client device to warn against, prevent, and/or detect one or more issues associated with managing the unit. In this way, the unit may be effectively managed by the client device, and the user may be apprised of any unit related issues associated with the model.

The foregoing disclosure provides illustration and description, but is not intended to be exhaustive or to limit the implementations to the precise form disclosed. Modifications and variations are possible in light of the above disclosure or may be acquired from practice of the implementations.

As used herein, component is intended to be broadly construed as hardware, firmware, or a combination of hardware and software.

As used herein, program code is to be broadly interpreted to include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, program code may include different combinations of the above-identified classes (e.g., text-based code, binary code, text files, etc.). Additionally, or alternatively, program code may include code generated using a dynamically-typed programming language (e.g., the M language, a MATLAB® language, a MATLAB-compatible language, a MATLAB-like language, etc.) that can be used to express problems and/or solutions in mathematical notations. Additionally, or alternatively, program code may be of any type, such as a function, a script, an object, etc., and a portion of program code may include one or more characters, lines, etc. of the program code.

Certain user interfaces have been described herein. In some implementations, the user interfaces may be customizable by a user or a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
      receive information identifying a model,
         the model, when executed, causing an operation to be performed;
      identify a unit associated with the operation;
      determine that the unit is at least one of:
         an abstract unit,
         a unit associated with a dimensionless quantity,
         a sub-unit,
         a partial unit,
         a dynamic unit, or
         an enumerated unit;
      determine information that identifies one or more unit properties associated with the unit,
         the one or more unit properties identifying an attribute that is to be used to determine, from a set of unit rules, one or more unit rules associated with the unit based on the one or more unit properties and information associated with the operation,
         the set of unit rules including:
            one or more default unit rules associated with the operation, and
            one or more overriding unit rules that modify one or more of the one or more default unit rules associated with the operation,
         the one or more unit rules including:
            a unit rule associated with determining an output unit of the operation, or one of the one or more overriding unit rules, and
            a unit rule associated with managing the at least one of the abstract unit, the unit associated with the dimensionless quantity, the sub-unit, the partial unit, the dynamic unit, or the enumerated unit; and
      provide a result, associated with the operation, based on the one or more unit rules.

2. The device of claim 1, where the one or more unit properties include at least one of:
   information indicating that the unit can be traced to provenance associated with the unit;
   information indicating a preference associated with the unit; or
   information indicating a constraint associated with the unit.

3. The device of claim 1, where the one or more processors are further to:
   determine that the unit is the unit associated with the dimensionless quantity;
   determine that the operation is designed to receive another unit associated with the dimensionless quantity; and
   determine the one or more unit rules based on determining that the operation is designed to receive the other unit associated with the dimensionless quantity,
      the one or more unit rules indicating that the operation cannot receive the unit associated with the dimensionless quantity.

4. The device of claim 1, where the one or more processors are further to:
   determine that the unit is the abstract unit;
   determine that the operation is designed to receive a different abstract unit that is different than the abstract unit; and
   determine the one or more unit rules based on determining that the operation is designed to receive the different abstract unit,
      the one or more unit rules indicating that the operation is not designed to receive the abstract unit.

5. The device of claim 1, where the one or more processors are further to:
   identify at least one of a design minimum or a design maximum associated with a value,
      the value being associated with the unit; and
   determine the one or more unit rules based on the at least one of the design minimum or the design maximum,
      the one or more unit rules identifying a default unit prefix associated with the unit; or
      the one or more unit rules identifying a data type error associated with the unit.

6. The device of claim 1, where the one or more processors are further to:
   determine a unit property identifying the unit as an inactive unit associated with the operation; and
   determine the one or more unit rules based on the unit property identifying the unit as the inactive unit.

7. The device of claim 1, where the one or more processors, are further to:
   determine that the operation fails based on the one or more unit rules; and
   determine that a unit error has occurred based on determining that the operation fails,
      the result including an indication that the unit error has occurred.

8. A non-transitory computer-readable medium storing instructions, the instructions comprising:
   one or more instructions that, when executed by one or more processors, cause the one or more processors to:
      obtain information identifying a model, the model, when executed, causing an operation to
be performed;
identify a unit associated with the operation;
determine that the unit is at least one of:
an abstract unit,
a unit associated with a dimensionless quantity,
a sub-unit,
a partial unit,
a dynamic unit, or
an enumerated unit;
determine one or more unit properties associated with
the unit,
the one or more unit properties identifying a characteristic that is to be used to determine, from a set of unit rules, one or more unit rules associated with the unit based on the one or more unit properties and information associated with the operation;
the set of unit rules including:
one or more default unit rules associated with the operation, and
one or more overriding unit rules that modify one or more of the one or more default unit rules associated with the operation,
the one or more unit rules including:
a unit rule associated with determining an output unit of the operation, or one of the one or more overriding unit rules, and
a unit rule associated with managing the at least one of the abstract unit, the unit associated with the dimensionless quantity, the sub-unit, the partial unit, the dynamic unit, or the enumerated unit; and
indicate a result, associated with the operation, based on the one or more unit rules.

9. The non-transitory computer-readable medium of claim 8, where the one or more unit properties include at least one of:
information indicating that the unit can be traced to provenance associated with the unit;
information indicating a preference associated with the unit; or
information indicating a constraint associated with the unit.

10. The non-transitory computer-readable medium of claim 8, where the one or more instructions, when executed by the one or more processors, further cause the one or more processors to:
determine that the unit is the unit associated with the dimensionless quantity;
determine that the operation is configured to receive another unit associated with the dimensionless quantity; and
determine the one or more unit rules based on determining that the operation is configured to receive the other unit associated with the dimensionless quantity,
the one or more unit rules indicating that the operation cannot receive the unit associated with the dimensionless quantity.

11. The non-transitory computer-readable medium of claim 8, where the one or more instructions further cause the one or more processors to:
determine that the unit is a user defined unit; and
determine the one or more unit rules based on determining that the unit is the user defined unit.

12. The non-transitory computer-readable medium of claim 8, where the one or more instructions, when executed by the one or more processors, further cause the one or more processors to:
identify at least one of a design minimum or a design maximum associated with a value,
the value being associated with the unit; and
determine the one or more unit rules based on the at least one of the design minimum or the design maximum,
the one or more unit rules identifying a default unit prefix associated with the unit; or
the one or more unit rules identifying a data type error associated with the unit.

13. The non-transitory computer-readable medium of claim 8, where the one or more instructions, when executed by the one or more processors, further cause the one or more processors to:
determine a unit property identifying the unit as an inactive unit associated with the operation; and
determine the one or more unit rules based on the unit property identifying the unit as the inactive unit.

14. The non-transitory computer-readable medium of claim 8, where the one or more instructions further cause the one or more processors to:
provide, to a user, a report associated with the one or more unit rules,
the report including information associated with one or more unit conversions associated with the one or more unit rules.

15. A method, comprising:
receiving information identifying a model,
the model, when executed, causing an operation to be performed, and
the receiving being performed by a device;
identifying a unit associated with the operation,
the identifying being performed by the device;
determining that the unit is at least one of:
an abstract unit,
a unit associated with a dimensionless quantity,
a sub-unit,
a partial unit,
a dynamic unit, or
an enumerated unit, and
the determining being performed by the device;
obtaining information that identifies a group of unit properties associated with the unit,
the group of unit properties identifying a group of attributes that are to be used to identify, from a set of unit rules, one or more unit rules associated with the unit based on the group of unit properties and information associated with the operation,
the set of unit rules including:
one or more default unit rules associated with the operation, and
one or more overriding unit rules that modify one or more of the one or more default unit rules associated with the operation,
the one or more unit rules including:
a unit rule associated with determining an output unit of the operation, or one of the one or more overriding rules, and
a unit rule associated with managing the at least one of the abstract unit, the unit associated with the dimensionless quantity, the sub-unit, the partial unit, the dynamic unit, or the enumerated unit, and
the obtaining being performed by the device; and providing a result, associated with the operation, based on the one or more unit rules,
the providing being performed by the device.

16. The method of claim 15, where the group of unit properties includes at least one of:
    information indicating that the unit can be traced to provenance associated with the unit;
    information indicating a preference associated with the unit; or
    information indicating a constraint associated with the unit.

17. The method of claim 15, further comprising:
determining that the unit is the abstract unit;
determining that the operation is designed to receive a different abstract unit that is different than the abstract unit; and
identifying the one or more unit rules based on determining that the operation is designed to receive the different abstract unit,
    the one or more unit rules indicating that the operation is not designed to receive the abstract unit.

18. The method of claim 15, further comprising:
determining that the unit is a user defined unit; and
identifying the one or more unit rules based on determining that the unit is the user defined unit.

19. The method of claim 15, further comprising:
identifying at least one of a design minimum or a design maximum associated with a value,
    the value being associated with the unit; and
identifying the one or more unit rules based on the at least one of the design minimum or the design maximum,
    the one or more unit rules identifying a default unit prefix associated with the unit; or
    the one or more unit rules identifying a data type error associated with the unit.

20. The method of claim 15, further comprising:
determining a unit property identifying the unit as an active unit associated with the operation; and
identifying the one or more unit rules based on the unit property identifying the unit as the active unit.

* * * * *